United States Patent
Sommerlade et al.

(10) Patent No.: US 11,706,384 B2
(45) Date of Patent: Jul. 18, 2023

(54) ADJUSTING PARTICIPANT GAZE IN VIDEO CONFERENCES

(71) Applicant: Microsoft Technology Licensing, LLC, Redmond, WA (US)

(72) Inventors: Eric Chris Wolfgang Sommerlade, Oxford (GB); Alexandros Neophytou, London (GB); Sunando Sengupta, Reading (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/342,849

(22) Filed: Jun. 9, 2021

(65) Prior Publication Data

US 2022/0400228 A1  Dec. 15, 2022

(51) Int. Cl.
  *H04N 7/14* (2006.01)
  *G06V 40/16* (2022.01)
  (Continued)

(52) U.S. Cl.
  CPC .............. *H04N 7/144* (2013.01); *G06F 3/013* (2013.01); *G06V 40/103* (2022.01);
  (Continued)

(58) Field of Classification Search
  CPC .......... H04N 7/14; H04N 7/05; H04N 5/2628; G06F 3/01; G06F 3/013; G06K 9/00
  (Continued)

(56) References Cited

U.S. PATENT DOCUMENTS

| 8,957,943 B2 | 2/2015 | Nourbakhsh |
| 9,111,171 B2 | 8/2015 | Son et al. |

(Continued)

FOREIGN PATENT DOCUMENTS

| WO | 2016112346 A1 | 7/2016 |
| WO | 2020181523 A1 | 9/2020 |

OTHER PUBLICATIONS

Yang et al., "Eye Gaze Correction with Stereovision for Video-Teleconferencing", In Proceeding of European Conference on Computer Vision, May 28, 2002, pp. 479-494.

(Continued)

*Primary Examiner* — Melur Ramakrishnaiah

(57) ABSTRACT

Methods and systems for applying gaze adjustment techniques to participants in a video conference are disclosed. Some examples may include: receiving, at computing system, image adjustment information associated with a video stream including images of a first participant, identifying, for a display layout of a communication application, a location displaying the images of the first participant, determining, based on the received image adjustment information, a location displaying images of a second participant for the display layout, the received image adjustment information indicating that an eye gaze of the first participant being directed toward the second participant, computing an eye gaze direction of the first participant based on the location displaying images of the second participant, generating gaze-adjusted images based on the desired eye gaze direction of the first participant and replacing the images within the video stream with the gaze-adjusted images.

20 Claims, 13 Drawing Sheets

(51) Int. Cl.
　　　*G06V 40/10*　　　(2022.01)
　　　*G06F 3/01*　　　(2006.01)
　　　*H04N 7/15*　　　(2006.01)
(52) U.S. Cl.
　　　CPC .......... *G06V 40/171* (2022.01); *H04N 7/147* (2013.01); *H04N 7/152* (2013.01)
(58) Field of Classification Search
　　　USPC .......................................... 348/14.01–15.16
　　　See application file for complete search history.

(56) References Cited

U.S. PATENT DOCUMENTS

| | | | |
|---|---|---|---|
| 9,288,388 B2 | 3/2016 | Son et al. | |
| 9,300,916 B1 | 3/2016 | Breedvelt-schouten et al. | |
| 9,740,938 B2 | 8/2017 | Nilsson et al. | |
| 2003/0197779 A1 | 10/2003 | Zhang et al. | |
| 2008/0278516 A1 | 11/2008 | Santon | |
| 2012/0206554 A1* | 8/2012 | Garcia | H04N 7/15 348/E7.078 |
| 2013/0070046 A1 | 3/2013 | Wolf et al. | |
| 2014/0211995 A1 | 7/2014 | Model | |
| 2015/0085056 A1* | 3/2015 | Van Broeck | H04N 7/15 348/14.1 |
| 2016/0234463 A1 | 8/2016 | Breedvelt-schouten et al. | |
| 2016/0275314 A1 | 9/2016 | Thörn et al. | |
| 2016/0323541 A1 | 11/2016 | Nilsson et al. | |
| 2016/0378183 A1 | 12/2016 | Teshome et al. | |
| 2017/0255786 A1 | 9/2017 | Krishnamurthi | |
| 2019/0110023 A1 | 4/2019 | Sakai et al. | |
| 2019/0138738 A1 | 5/2019 | Ricknäs et al. | |
| 2019/0230310 A1* | 7/2019 | Faulkner | G06V 40/161 |
| 2019/0266701 A1 | 8/2019 | Isikdogan et al. | |
| 2020/0004333 A1 | 1/2020 | Lee | |
| 2020/0202561 A1 | 6/2020 | Liu et al. | |
| 2020/0312279 A1 | 10/2020 | Sage et al. | |
| 2021/0026446 A1 | 1/2021 | Liu et al. | |
| 2021/0201021 A1 | 7/2021 | Novelli et al. | |
| 2021/0360199 A1* | 11/2021 | Oz | G06F 3/013 |
| 2021/0382542 A1 | 12/2021 | Liu et al. | |
| 2022/0141422 A1 | 5/2022 | Bathiche et al. | |
| 2022/0221932 A1 | 7/2022 | Bathiche et al. | |

OTHER PUBLICATIONS

"Non Final Office Action Issued in U.S. Appl. No. 17/146,719", dated Mar. 18, 2022, 24 Pages.

Ganin, et al., "DeepWarp: Photorealistic Image Resynthesis for Gaze Manipulation", In Repository of arXiv: 1607.07215v2, Jul. 26, 2016, 18 Pages.

Isikdogan, et al., "Eye Contact Correction using Deep Neural Networks", In Proceedings of IEEE Winter Conference on Applications of Computer Vision, Mar. 1, 2020, pp. 3307-3315.

"International Search Report and Written Opinion Issued in PCT Application No. PCT/US21/048306", dated Dec. 13, 2021, 13 Pages.

"International Search Report and Written Opinion Issued in PCT Application No. PCT/US21/062718", dated Mar. 14, 2022, 11 Pages.

Vertegaal, et al., "GAZE-2: Conveying Eye Contact in Group Video Conferencing Using Eye-Controlled Camera Direction", In Proceedings of the SIGCHI conference on Human factors in computing systems, Apr. 5, 2003, pp. 521-528.

Wood, et al., "GazeDirector: Fully Articulated Eye Gaze Redirection in Video", In Eurographics vol. 37, Issue 2, Apr. 16, 2018, 9 Pages.

Wood, et al., "GazeDirector: Fully Articulated Eye Gaze Redirection in Video", In Repository of arXiv: 1704.08763v1, Apr. 27, 2017, 10 Pages.

"Non Final Office Action Issued in U.S. Appl. No. 17/084,937", dated Jul. 29, 2022, 32 Pages.

"Non Final Office Action Issued in U.S. Appl. No. 17/084,937", dated Mar. 28, 2022, 30 Pages.

"International Search Report and Written Opinion Issued in PCT Patent Application No. PCT/US22/028412", dated Sep. 1, 2022, 12 Pages.

"Final Office Action Issued in U.S. Appl. No. 17/146,719", dated Nov. 21, 2022, 27 Pages.

"Notice of Allowance Issued in U.S. Appl. No. 17/084,937", dated Jan. 13, 2023, 9 Pages.

* cited by examiner

ADJUSTING PARTICIPANT GAZE IN VIDEO CONFERENCES

BACKGROUND

Video communications are quickly becoming a primary means of human communication in the business and academic worlds, with video meetings and recorded presentations often serving as a replacement for in-person meetings. It is common for images of participants in a layout or grid at a video communication application to be arbitrarily arranged. If a participant is actively listening to a presenter, but the presenter appears in the lower left corner of a layout or grid, then the video of the participant as seen by the presenter may suggest to the presenter that the participant is looking away (that is, the participant is looking at the presenter in the lower left corner of the display and not toward a central area where a camera may be). With multiple participants appearing to look away from the presenter, the presenter may get distracted and may be less effective at communicating. Additionally, other non-verbal forms of communication are generally lost in video communications. In addition to eye contact, body language such as head pose and body movement/orientation in the direction of a participant may be lost in such video communication scenarios, especially in those scenarios where images of participants are arbitrarily displayed in a grid-like fashion.

It is with respect to these and other general considerations that embodiments have been described. Also, although relatively specific problems have been discussed, it should be understood that the embodiments should not be limited to solving the specific problems identified in the background.

SUMMARY

The following presents a simplified summary in order to provide a basic understanding of some aspects described herein. This summary is not an extensive overview of the claimed subject matter. This summary is not intended to identify key or critical elements of the claimed subject matter nor delineate the scope of the claimed subject matter. This summary's sole purpose is to present some concepts of the claimed subject matter in a simplified form as a prelude to the more detailed description that is presented later.

In accordance with examples of the present disclosure, gaze adjustments affecting the eyes, head pose, and upper body portion of a user as depicted in an image may be modified to introduce non-verbal communications that are typically lost in video conferencing application. More specifically, an eye gaze tracker may be used to determine a location at which the eye gaze of a participant is directed. If the eye gaze is directed to another participant taking part in the video conference, then the eyes, head pose, and/or upper body portion of the participant may be modified such that the eye gaze of the participant as displayed in the video conferencing application appears to others to be directed toward the previously identified other participant.

In accordance with at least one example of the present disclosure, a method is described. The method may include: receiving, at computing system, image adjustment information associated with a video stream including images of a first participant; identifying, for a display layout of a communication application, a location displaying the images of the first participant; determining, based on the received image adjustment information, a location displaying images of a second participant for the display layout, the received image adjustment information indicating that an eye gaze of the first participant being directed toward the second participant; computing an eye gaze direction of the first participant based on the location displaying images of the second participant; generating gaze-adjusted images based on the eye gaze direction of the first participant, wherein the gaze-adjusted images include at least one of an adjusted eye gaze direction of the first participant or an adjusted head pose of the first participant; and replacing the images within the video stream with the gaze-adjusted images.

In accordance with at least one example of the present disclosure, a system is described. The system may include one or more hardware processors configured by machine-readable instructions to: receive, at computing system, image adjustment information associated with a video stream including images of a first participant; identify, for a display layout of a communication application, a location displaying the images of the first participant; determine, based on the received image adjustment information, a location displaying images of a second participant for the display layout, the received image adjustment information indicating that an eye gaze of the first participant be directed toward the second participant; compute an eye gaze direction of the first participant based on the location displaying images of the second participant; generate gaze-adjusted images based on the eye gaze direction of the first participant, wherein the gaze-adjusted images include at least one of an adjusted eye gaze direction of the first participant or an adjusted head pose of the first participant; and replace the images within the video stream with the gaze-adjusted images.

In accordance with at least one example of the present disclosure, a method is described. The method may include: capturing, via a camera of a computing system, a video stream including images of a user of the computing system; detecting, via a processor of the computing system, a face region of the user within the images; detecting facial feature regions of the user within the images based on the detected face region; detecting an eye region of the user within the images based on the detected facial feature regions; computing an eye gaze direction of the user based on the detected eye region; identifying a participant in a display layout of a video communication application based on the eye gaze direction of the user; and providing gaze information to a gaze coordinator, the gaze information including an identifier associated with the user and an identifier associated with the participant.

This Summary is provided to introduce a selection of concepts in a simplified form, which is further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the following description and, in part, will be apparent from the description, or may be learned by practice of the disclosure.

BRIEF DESCRIPTION OF THE DRAWINGS

Non-limiting and non-exhaustive examples are described with reference to the following Figures.

DETAILED DESCRIPTION

Figure 1:
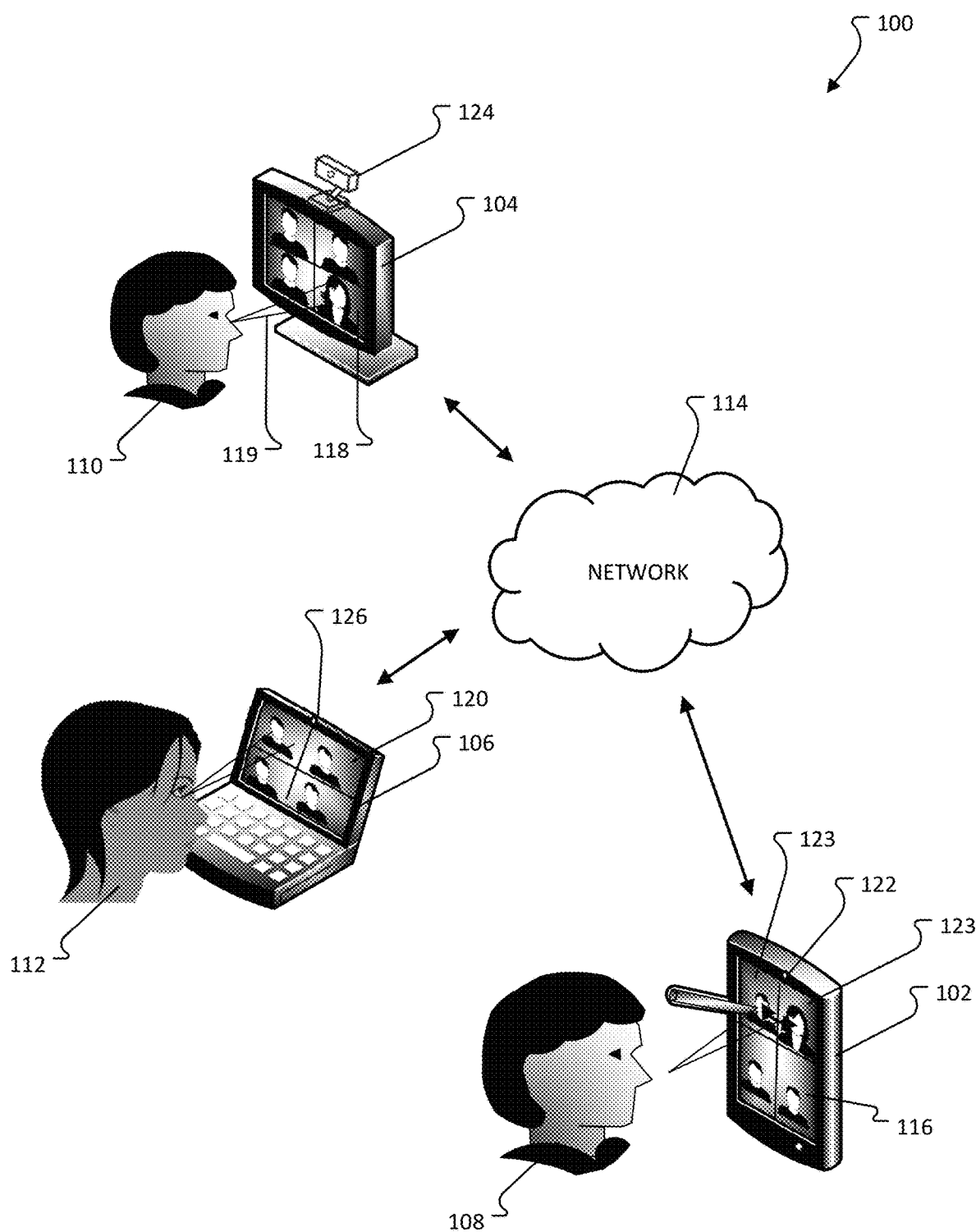
FIG. 1 is a block diagram of a network environment that is suitable for implementing eye gaze, head pose, upper and/or full body adjustment techniques in accordance with examples of the present disclosure.

The signal of attention plays an important role in human communication. Moreover, one of the most important signals for attention is eye gaze. Specifically, various psychological studies have demonstrated that humans are more likely to effectively engage with one another during interpersonal communications when they are able to make eye contact. However, in various video communication scenarios, such as video calls, video conferences, and video narrative streams, this primary signal is lost. Unlike in live meetings, in video communication scenarios, it is often difficult to see where or on whom the various participants' attention is focused. This type of information is used to indicate attention, initiative, expectation, etc. In addition to eye contact, body language such as head pose and body movement/orientation in the direction of a participant may be lost in such communication scenarios, especially in those scenarios where participants are arbitrarily displayed in a grid-like fashion.

Further, if a participant's camera is located directly above the display device, a receiver may perceive the participant's eye gaze as being focused on a point below the receiver's eye level or otherwise at a point away from a display device and away from a conferencing session. In addition, when a participant is looking at a presenter, the presenter may be located in a lower left corner of a display device for example; accordingly, from the presenter's perspective, the participant is looking away and may appear to be disinterested even when the participant is engaged and attentive.

The present techniques provide real-time video modification to adjust participants' gaze during video communications. "Gaze" as used herein is the video representation of a user to show directional viewing of that user. Consequently, and more specifically, the present techniques adjust the video representations of a user's eye gaze, head pose, body portions of participants in real-time such that participants may appear to be attentive and engaged during the video communication. As a result, such techniques increase the quality of human communication that can be achieved via digital live and/or recorded video sessions.

In various examples, the gaze adjustment techniques described herein involve capturing a video stream of a user's face and making adjustments to the images within the video stream such that the direction of the user's eye gaze is adjusted and/or the user's head pose and/or body is adjusted. In some examples, the gaze adjustments described herein are provided, at least in part, by modifying the images within the video stream to synthesize images including specific eye gaze locations and/or specific head poses and/or body movements.

As a preliminary matter, some of the figures describe concepts in the context of one or more structural components, referred to as functionalities, modules, features, elements, etc. The various components shown in the figures can be implemented in any manner, for example, by software, hardware (e.g., discrete logic components, etc.), firmware, and so on, or any combination of these implementations. In one example, the various components may reflect the use of corresponding components in an actual implementation. In other examples, any single component illustrated in the figures may be implemented by a number of actual components. The depiction of any two or more separate components in the figures may reflect different functions performed by a single actual component.

Other figures describe the concepts in flowchart form. In this form, certain operations are described as constituting distinct blocks performed in a certain order. Such implementations are exemplary and non-limiting. Certain blocks described herein can be grouped together and performed in a single operation, certain blocks can be broken apart into plural component blocks, and certain blocks can be performed in an order that differs from that which is illustrated herein, including a parallel manner of performing the blocks. The blocks shown in the flowcharts can be implemented by software, hardware, firmware, and the like, or any combination of these implementations. As used herein, hardware may include computing systems, discrete logic components, such as application specific integrated circuits (ASICs), and the like, as well as any combinations thereof.

As for terminology, the phrase "configured to" encompasses any way that any kind of structural component can be constructed to perform an identified operation. The structural component can be configured to perform an operation using software, hardware, firmware and the like, or any combinations thereof. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware.

The term "logic" encompasses any functionality for performing a task. For instance, each operation illustrated in the flowcharts corresponds to logic for performing that operation. An operation can be performed using software, hardware, firmware, etc., or any combinations thereof.

As utilized herein, the terms "component," "system," "client," and the like are intended to refer to a computer-related entity, either hardware, software (e.g., in execution), and/or firmware, or a combination thereof. For example, a component can be a process running on a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter.

FIG. 1 is a block diagram of a network environment 100 that is suitable for implementing eye gaze, head pose, upper and/or full body adjustment techniques in accordance with examples of the present disclosure. The network environment 100 includes computing systems 102, 104, and 106. Each computing system 102, 104, and 106 corresponds to one or more users, such as users 108, 110, and 112, respectively.

In various examples, each computing system 102, 104, and 106 is connected to a network 114. The network 114 may be a packet-based network, such as the Internet. Furthermore, in various examples, each computing system 102, 104, and 106 includes a display 116, 118, and 120, respectively, and a camera 122, 124, and 126, respectively. The camera may be a built-in component of the computing system, such as the camera 122 corresponding to the computing system 102, which is a tablet computer, and the camera 126 corresponding to the computing system 106, which is a laptop computer. Alternatively, the camera may be an external component of the computing system, such as the camera 124 corresponding to the computing system 104, which is a desktop computer. Moreover, it is to be understood that the computing systems 102, 104, and/or 106 can take various other forms, such as, for example, that of a mobile phone (e.g., smartphone), wearable computing system, television (e.g., smart TV), set-top box, and/or gaming console. Furthermore, the specific embodiment of the display device and/or camera may be tailored to each particular type of computing system.

At any given time, one or more users 108, 110, and/or 112 may be communicating with any number of other users 110, 112, and/or 108 (or others, not shown) via a video stream transmitted across the network 114. Moreover, in various examples, this video communication may include a particular user, sometimes referred to herein as the "presenter", presenting information to one or more remote users, sometimes referred to herein as the "receiver(s)". As an example, if the user 108 is acting as the presenter, user 110 and user 112 may focus their attention and/or eye contact on the user 108 in their respective displays 118, 120 of their respective computing systems 104 and 106. Alternatively, or in addition, user 110 and user 112 may focus their attention and/or eye contact on representations of one another at the display of their respective computing systems 104 and 106. In such examples, the computing system 102 may be configured to implement the eye gaze, head pose, upper and/or full body adjustment techniques described herein. Accordingly, the presenter (e.g., 108) may perceive the adjusted eye gaze, head pose, upper and/or full body adjustments as a more natural representation of the users 110 and 112; further, body language in eye gaze, head pose, upper and/or full body positions may be communicated to the user 108. More specifically, as user 110 is focusing on or otherwise exhibiting an eye gaze in the direction of the video representation of user 112, and user 112 is focusing on or otherwise exhibiting an eye gaze in the direction of the video representation of user 110; accordingly, the video representation of users 110 and 112 as displayed by the display device 116 of computing system 102, may be adjusted such that the eyes, head pose, and/or other body positions are reflective of the user's attention and/or gaze. That is, the images of the user 110 and 112 may be adjusted such that users 110 and 112 appear to be looking at one another. Details relating to an exemplary implementation of the computing systems (and the associated eye gaze, head pose, and/or upper/fully body adjustment capabilities) are described further with respect to FIG. 2.

It is to be understood that the block diagram of FIG. 1 is not intended to indicate that the network environment 100 is to include all the components shown in FIG. 1 in every case. For example, the exact number of users and/or computing systems may vary depending on the details of the specific implementation. Moreover, the designation of each user as a presenter or a receiver may continuously change as the video communication progresses, depending on which user is currently acting as the presenter. Therefore, any number of the computing systems 102, 104 and/or 106 may be configured to implement the eye gaze, head pose, and/or other body position adjustment techniques described herein.

In some examples, the eye gaze, head pose, and/or other body position adjustment techniques are provided by a video streaming service that is configured for each computing system on demand. For example, the eye gaze, head pose, and/or other body position adjustment techniques described herein may be provided as a software licensing and delivery model, sometimes referred to as Software as a Service (SaaS). In such examples, a third-party provider may provide eye gaze, pose, head, and/or other body position adjustment to consumer computing systems, such as the presenter's computing system, via a software application running on a cloud infrastructure.

Furthermore, in some examples, one or more computing systems 102, 104, and/or 106 may have multiple users at any given point in time. Accordingly, the eye gaze, pose, head, and/or other body position adjustment techniques described herein may include an eye gaze, head pose, and/or other body position adjustment technique for each user at each of the one or more computing systems 102, 104, and/or 106. Each of the representations of the users displayed at a display device may be specific to a specific display device and/or location of such a display device in view of other display devices.

Figure 2:
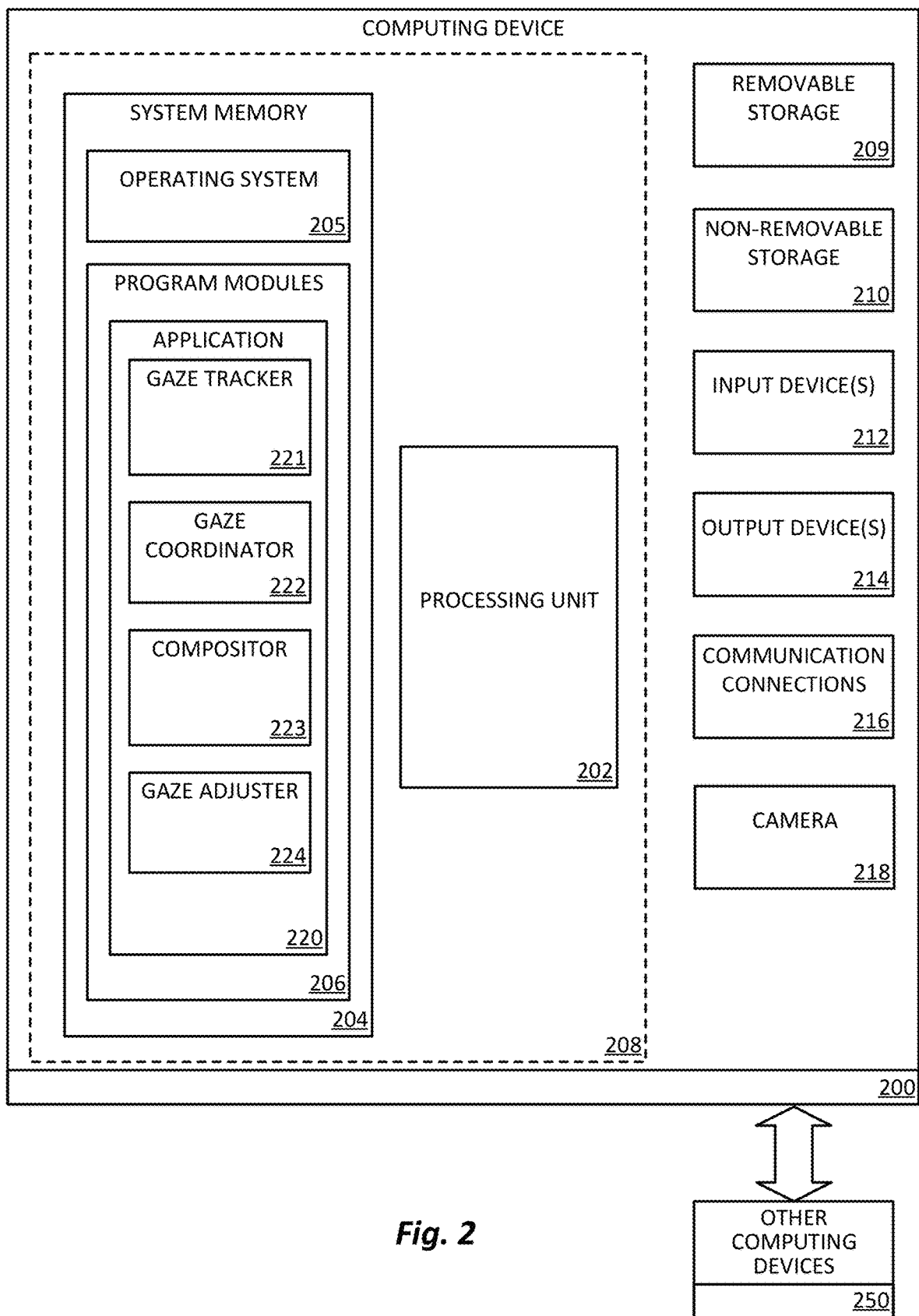
FIG. 2 is a block diagram of an example computing system that is configured to implement the eye gaze, pose, head, and/or other body position adjustment techniques in accordance with examples of the present disclosure.

FIG. 2 is a block diagram of an example computing system 200 that is configured to implement the eye gaze, pose, head, and/or other body position adjustment techniques in accordance with examples of the present disclosure. In various examples, the computing system 200 includes one or more of the computing systems 102, 104, and 106 described with respect to the network environment 100 of FIG. 1. The computing device components described below may be suitable for the computing and/or processing devices described above. In a basic configuration, the computing system 200 may include at least one processing unit 202 and a system memory 204. Depending on the configuration and type of computing device, the system memory 204 may comprise, but is not limited to, volatile storage (e.g., random-access memory (RAM)), non-volatile storage (e.g., read-only memory (ROM)), flash memory, or any combination of such memories.

The system memory 204 may include an operating system 205 and one or more program modules 206 suitable for running software application 220, such as one or more components supported by the systems described herein. The operating system 205, for example, may be suitable for controlling the operation of the computing system 102, 104, or 106 for example. As examples, system memory 204 may include a gaze tracker 221, a gaze coordinator 222, a compositor 223, and a gaze adjuster 224. The gaze tracker 221 may identify gaze and head pose of each participant that shares or does not share a video stream of their respective device. In some examples, the gaze tracker 221 may map gaze direction and head pose to an on-screen location for each user, or an "off screen" location if the user looks away. The gaze tracker 221 may provide an indication including a source (e.g., an identity of the user) and a target (e.g., a location of the directed gaze and/or an identity of the participant to which the gaze is directed) to the gaze coordinator 222. In examples where the user is not sharing their video stream, gaze/head pose tracking information is still relevant to signal attention to one particular target, or adjust an iconic representation according to the tracked gaze direction (e.g. the pupils of an emoji-avatar, or the user's profile picture). In examples where the user is neither sharing the video stream nor allowing access to their camera, the representation of the user may remain constant. The user still benefits from adjustment of the other participant's video streams.

The gaze coordinator 222 receives the information from the gaze tracker 221; as described above, the gaze coordinator 222 may receive source-target pairs identifying an identity of the user and an identity of the participant to which the user's gaze is directed. The gaze coordinator 222 may identify those video streams needing adjustments and may send to each participant, adjustment information including details for how the incoming video streams will need to be adjusted on the respective participant's device. The gaze coordinator 222 may also identify video streams that do not need adjustment or need adjustment in the same manner for all or a sufficient majority of participants. The gaze adjuster 224 can then perform this adjustment for the corresponding set of participants. In some examples, the gaze coordinator 222 adjusts an image of a participant who is not looking at the screen (or who has their video window obscured, on a second screen or hidden), such that the other participants do or do not become aware that said user is not looking directly ahead at a camera for instance. In examples, the gaze coordinator 222 may reside at a computing systems 102, 104, or 106; or the gaze coordinator 222 may reside in the cloud, a server, an off-premises environment.

The compositor 223 may place representations of the participants on the screen according to a layout of video conferencing application. For example, the participants may be placed in a grid, a round table, in a lecture room, or other environment. The gaze coordinator 222 may also provide a gaze position of each gaze that is tracked by the gaze tracker 221 to an on-screen location of the composited other participants to either directly or by assisting the gaze tracker 221 thereby creating the source-target pair. In examples, the gaze adjuster 224 may adjust an image of participants such that the gaze of the participants appear to be directed to another participant as provided by the source-target pair. In some examples, the gaze adjuster 224 may also change the appearance of a participant's eyes using estimates of the head pose and pixel values so that the user's head and torso can be rotated to appear like they are focusing both at their work and directly look at their contacts.

Furthermore, examples of the present disclosure may be practiced in conjunction with a graphics library, other operating systems, or any other application program and are not limited to any particular application or system. This basic configuration is illustrated in FIG. 2 by those components within a dashed line 208. The computing system 200 may have additional features or functionality. For example, the computing system 200 may also include additional data storage devices (removable and/or non-removable) such as, for example, magnetic disks, optical disks, or tape. Such additional storage is illustrated in FIG. 2 by a removable storage device 209 and a non-removable storage device 210.

As stated above, a number of program modules and data files may be stored in the system memory 204. While executing on the processing unit 202, the program modules 206 (e.g., software applications 220) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided programs, etc.

Furthermore, examples of the present disclosure may be practiced in an electrical circuit discrete electronic elements, packaged or integrated electronic chips containing logic gates, a circuit utilizing a microprocessor, or on a single chip containing electronic elements or microprocessors. For example, examples of the disclosure may be practiced via a system-on-a-chip (SOC) where each or many of the components illustrated in FIG. 2 may be integrated onto a single integrated circuit. Such an SOC device may include one or more processing units, graphics units, communications units, system virtualization units and various application functionality, all of which are integrated (or "burned") onto the chip substrate as a single integrated circuit. When operating via an SOC, the functionality, described herein, with respect to the capability of client to switch protocols may be operated via application-specific logic integrated with other components of the computing system 200 on the single integrated circuit (chip). Examples of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

The computing system 200 may also have one or more input device(s) 212 such as a keyboard, a mouse, a pen, a sound or voice input device, a touch, or swipe input device, and/or the camera 218, etc. The one or more input device 212 may include an image sensor, such as one or more image sensors included in a camera 124, 126, 122, or 218 for example. The output device(s) 214 may include those components such as, but not limited to, a display, speakers, a printer, etc. The aforementioned devices are examples and others may be used. The computing system 200 may include one or more communication connections 216 allowing communications with other computing devices/systems 250. Examples of suitable communication connections 216 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable, and non-removable media implemented in any method or technology for storage of information, such as computer readable instructions, data structures, or program modules. The system memory 204, the removable storage device 209, and the non-removable storage device 210 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing system 200. Any such computer storage media may be part of the computing system 200. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 3A:
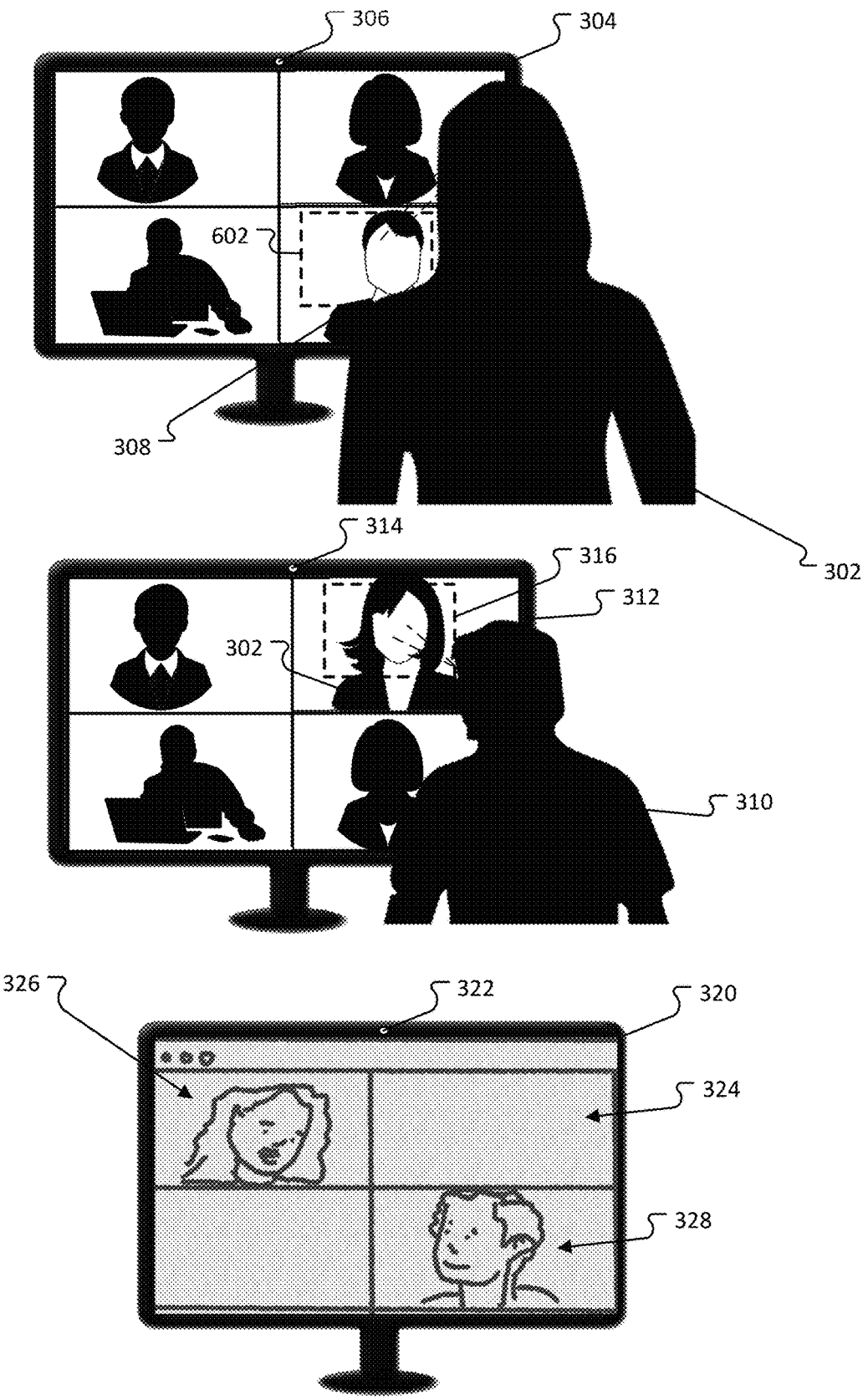
FIG. 3A depicts a first example of applying a gaze adjustment technique in accordance with examples of the present disclosure.

FIG. 3A depicts a first example of applying a gaze adjustment technique in accordance with examples of the present disclosure. A gaze adjustment technique may include one or more of adjusting an eye gaze, head pose, and/or upper and/or full body adjustments. For example, the appearance of a participant's eyes using estimates of the head pose and pixel values may be changed and the user's head and torso can be rotated to appear like they are focusing both at their work and directly look at their contacts.

As depicted in FIG. 3A, a first participant 302 may be viewing a conferencing session at a display device 304. The display device 304 may include an integrated camera 306 for acquiring a video stream, an image, or a stream of images of the participant 302. A gaze tracker, for example the gaze tracker 221, may utilize one or more of the images to determine that the gaze 308 of the participant 302 is directed to an image or video representation of the participant 310. A second participant 310 may be viewing the same conferencing session at a display device 312. The display device 312 may include an integrated camera 314 for acquiring a video stream, an image, or a stream of images of the participant 310. A gaze tracker, for example the gaze tracker 221, may utilize one or more of the images to determine that the gaze 316 of the participant 310 is directed to an image or video representation of the participant 302.

In examples, a compositor of the participant's 302 computing system, may access information indicating that in the participant's 302 video conferencing session, the participant 310 is located at location where the gaze 308 of the participant 302 is directed. Similarly, a compositor of the participant's 310 computing system, such as the compositor 223, may access information indicating that in the participant's 310 video conferencing session, the participant 302 is located at location where the gaze 316 of the participant 310 is directed. Accordingly, the gaze tracker associated with the participant 302 may provide a source-target pair that includes (participant 302, participant 310) to the gaze coordinator 222. Similarly, the gaze tracker associated with the participant 310 may provide a source-target pair that includes (participant 310, participant 302) to the gaze coordinator 222. The gaze coordinator 222 for example, may then provide information including adjustment information for one or more of the participants in the video conferencing session.

In examples, a third participant may be viewing a conferencing session at a display device 320. The display device 320 may include an integrated camera 322 for acquiring a video stream, an image, or a stream of images of the third participant. A gaze adjuster associated with a computing system of the third participant, for example gaze adjuster 224, may receive the information from the gaze coordinator 222, receive location information specific to the layout 324, and determine that the first participant is depicted at location 326 and the second participant is depicted at location 328. The gaze adjuster 224 may then adjust the gaze in an image at the location 326 of the first participant 302 and the gaze in an image at the location 328 of the second participant 310 such that the two participants appear to be looking at each other. Further, as the gaze adjustment may also adjust pose and/or upper/total body position, the rotation of one or more body features are able to provide additional non-verbal information to a third participant viewing the conferencing session.

Figure 3B:
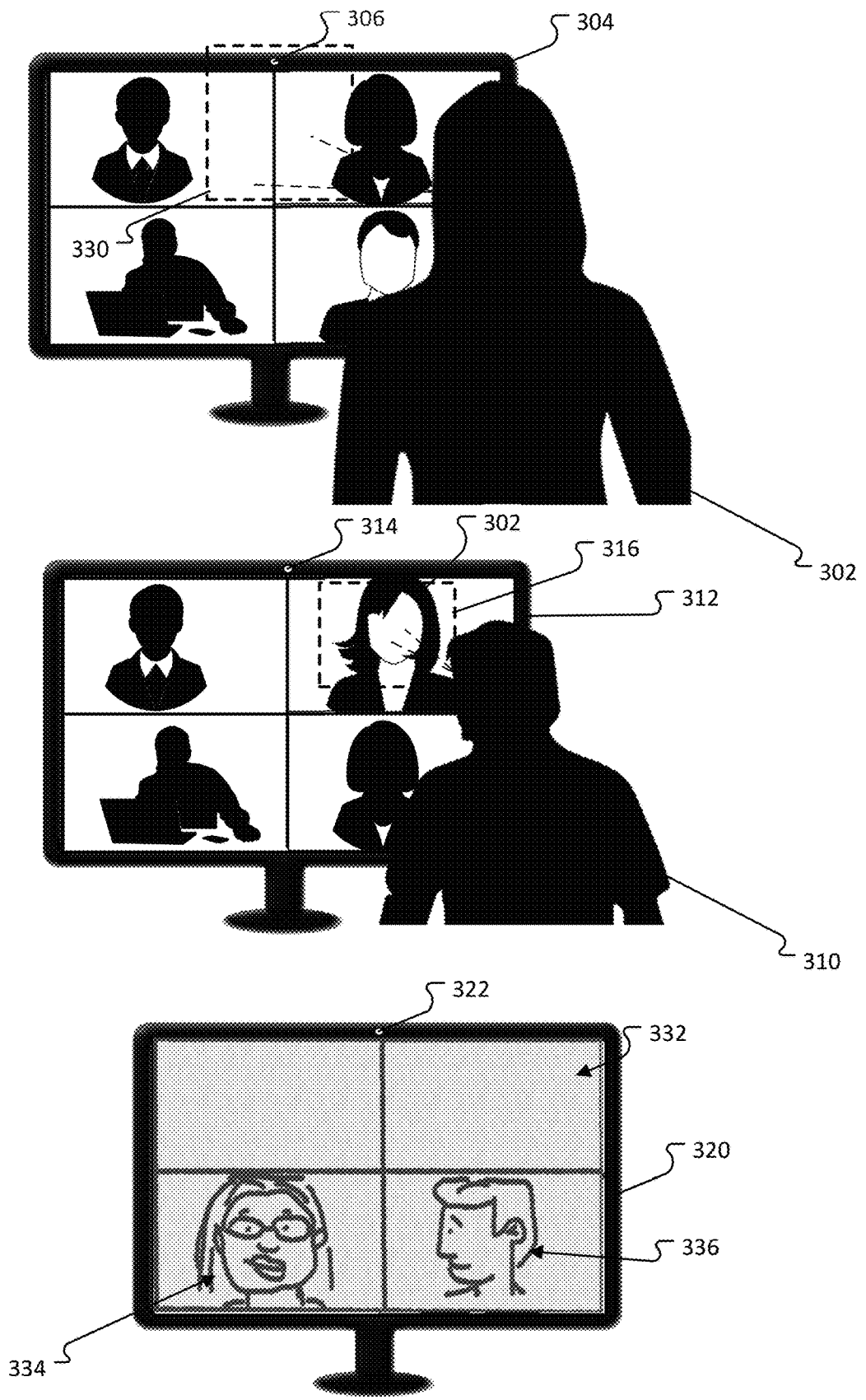
FIG. 3B depicts a second example of applying a gaze adjustment technique in accordance with examples of the present disclosure.

FIG. 3B depicts a second example of applying a gaze adjustment technique in accordance with examples of the present disclosure. As depicted in FIG. 3B, a first participant 302 may be viewing a conferencing session at a display device 304. The display device 304 may include an integrated camera 306 for acquiring a video stream, an image, or a stream of images of the participant 302. A gaze tracker, for example the gaze tracker 221, may utilize one or more of the images to determine that the gaze 330 of the participant 302 is directed to a center of the display device 304 and/or to the camera 306. A second participant 310 may be viewing the same conferencing session at a display device 312. The display device 312 may include an integrated camera 314 for acquiring a video stream, an image, or a stream of images of the participant 310. A gaze tracker, for example the gaze tracker 221, may utilize one or more of the images to determine that the gaze 316 of the 310 is directed to an image or video representation of the participant 302.

In examples, a compositor of the participant's 302 computing system, may access information indicating that in the participant's 302 video conferencing session, the camera or center of the display device 304 is located at location where the gaze 330 of the participant 302 is directed. Similarly, a compositor of the participant's 310 computing system, such as the compositor 223, may access information indicating that in the participant's 310 video conferencing session, the participant 302 is located at location where the gaze 316 of the participant 310 is directed. Accordingly, the gaze tracker associated with the participant 302 may provide a source-target pair that includes (participant 302, front) to the gaze coordinator 222. Similarly, the gaze tracker associated with the participant 310 may provide a source-target pair that includes (participant 310, participant 302) to the gaze coordinator 222. The gaze coordinator 222 for example, may then provide information including adjustment information for one or more of the participants in the video conferencing session.

In examples, a third participant may be viewing the conferencing session at a display device 320. The display device 320 may include an integrated camera 322 for acquiring a video stream, an image, or a stream of images of the third participant. A gaze adjuster associated with a computing system of the third participant, for example gaze adjuster 224, may receive the information from the gaze coordinator 222, receive location information specific to the layout 332, and determine that the first participant is depicted at location 334 and the second participant is depicted at location 336. The gaze adjuster 224 may adjust the gaze in an image at the location 336 of the second participant 310 such that the second participant 310 appears to be looking at the first participant 302. In some examples, the gaze adjuster 224 may adjust the gaze in an image at the location 334 of the first participant 302 such that the first participant 302 appears to be looking forward. Of course, in instances where the gaze of the first participant 302 is determined to be looking forward, no gaze adjustments may be necessary. Further, as the gaze adjustment may also adjust pose and/or upper/total body position, the rotation of one or more body features of the image at the location 336 depicting the second participant 310 provides additional non-verbal information to the third participant viewing the conferencing session that the first participant 302 appears to have the attention of the second participant 310.

Figure 3C:
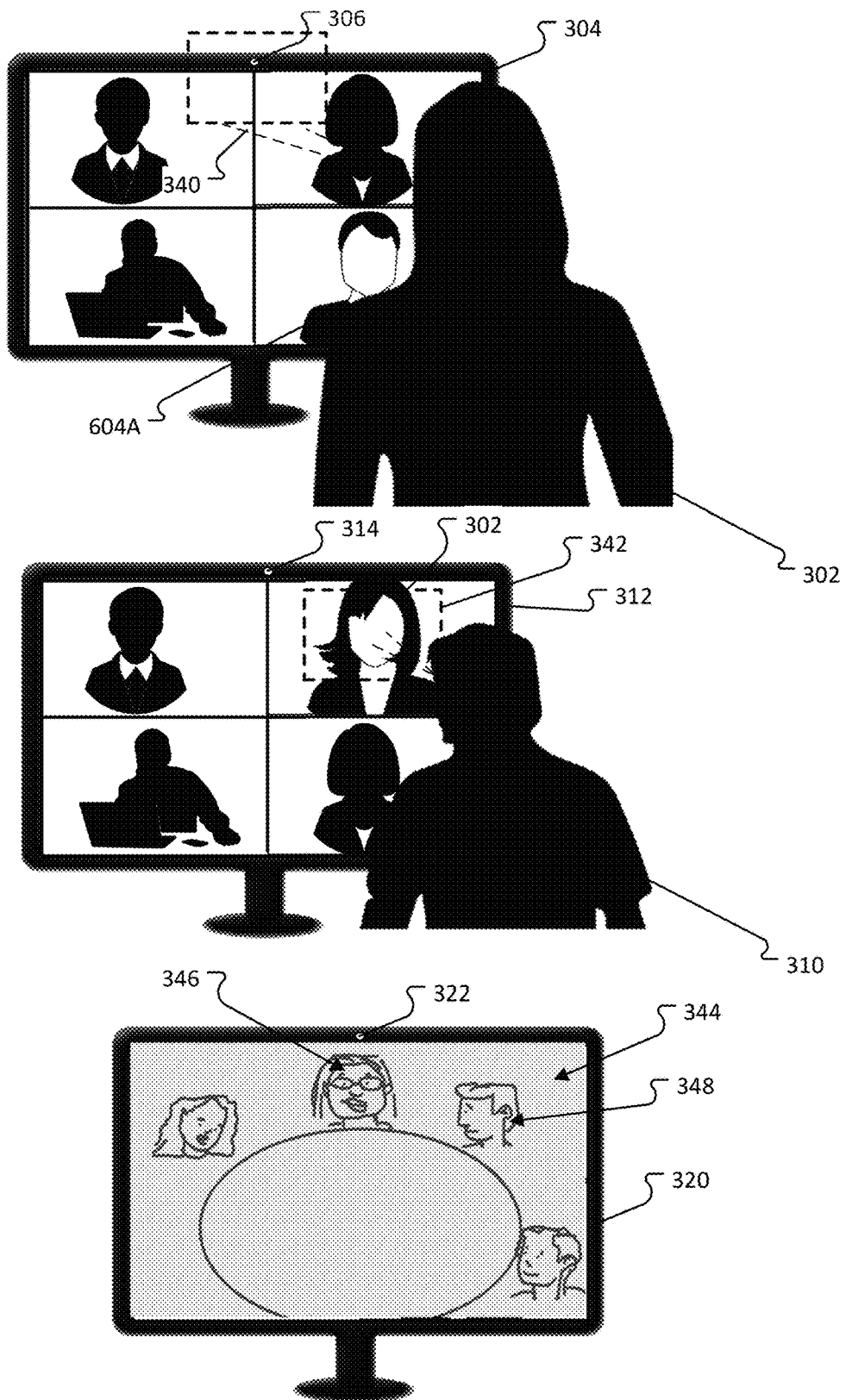
FIG. 3C depicts a third example of applying a gaze adjustment technique in accordance with examples of the present disclosure.

FIG. 3C depicts a third example of applying a gaze adjustment technique in accordance with examples of the present disclosure. As depicted in FIG. 3C, a first participant 302 may be viewing a conferencing session at a display device 304. The display device 304 may include an integrated camera 306 for acquiring a video stream, an image, or a stream of images of the participant 302. A gaze tracker, for example the gaze tracker 221, may utilize one or more of the images to determine that the gaze 340 of the participant 302 is directed to a center of the display device 304 and/or to the camera 306. A second participant 310 may be viewing the same conferencing session at a display device 312. The display device 312 may include an integrated camera 314 for acquiring a video stream, an image, or a stream of images of the participant 310. A gaze tracker, for example the gaze tracker 221, may utilize one or more of the images to determine that the gaze 342 of the participant 310 is directed to an image or video representation of the participant 302.

In examples, a compositor of the participant's 302 computing system, may access information indicating that in the participant's 302 video conferencing session, the camera or center of the display device 304 is located at location where the gaze 330 of the participant 302 is directed. Similarly, a compositor of the participant's 310 computing system, such as the compositor 223, may access information indicating that in the participant's 310 video conferencing session, the participant 302 is located at location where the gaze 316 of the participant 310 is directed. Accordingly, the gaze tracker associated with the participant 302 may provide a source-target pair that includes (participant 302, front) to the gaze coordinator 222. Similarly, the gaze tracker associated with the participant 310 may provide a source-target pair that includes (participant 310, participant 302) to the gaze coordinator 222. The gaze coordinator 222 for example, may then provide information including adjustment information for one or more of the participants in the video conferencing session.

In examples, a third participant may be viewing the conferencing session at a display device 320. The display device 320 may include an integrated camera 322 for acquiring a video stream, an image, or a stream of images of the third participant. A gaze adjuster associated with a computing system of the third participant, for example gaze adjuster 224, may receive the information from the gaze coordinator 222, receive location information specific to the layout 344, and determine that the first participant is depicted at location 346 and the second participant is depicted at location 348. The gaze adjuster 224 may adjust the gaze in a depiction of the second participant 310 such that the second participant 310 appears to be looking at the first participant 302. In some examples, the gaze adjuster 224 may adjust the gaze in a depiction of the first participant 302 such that the first participant 302 appears to be looking forward. Of course, in instances where the gaze of the first participant 302 is determined to be looking forward, no gaze adjustments may be necessary. Further, as the gaze adjustment may also adjust pose and/or upper/total body position, the rotation of one or more body features of the depiction of the second participant 310 provides additional non-verbal information to the third participant viewing the conferencing session that the first participant 302 appears to have the attention of the second participant 310.

Figure 3D:
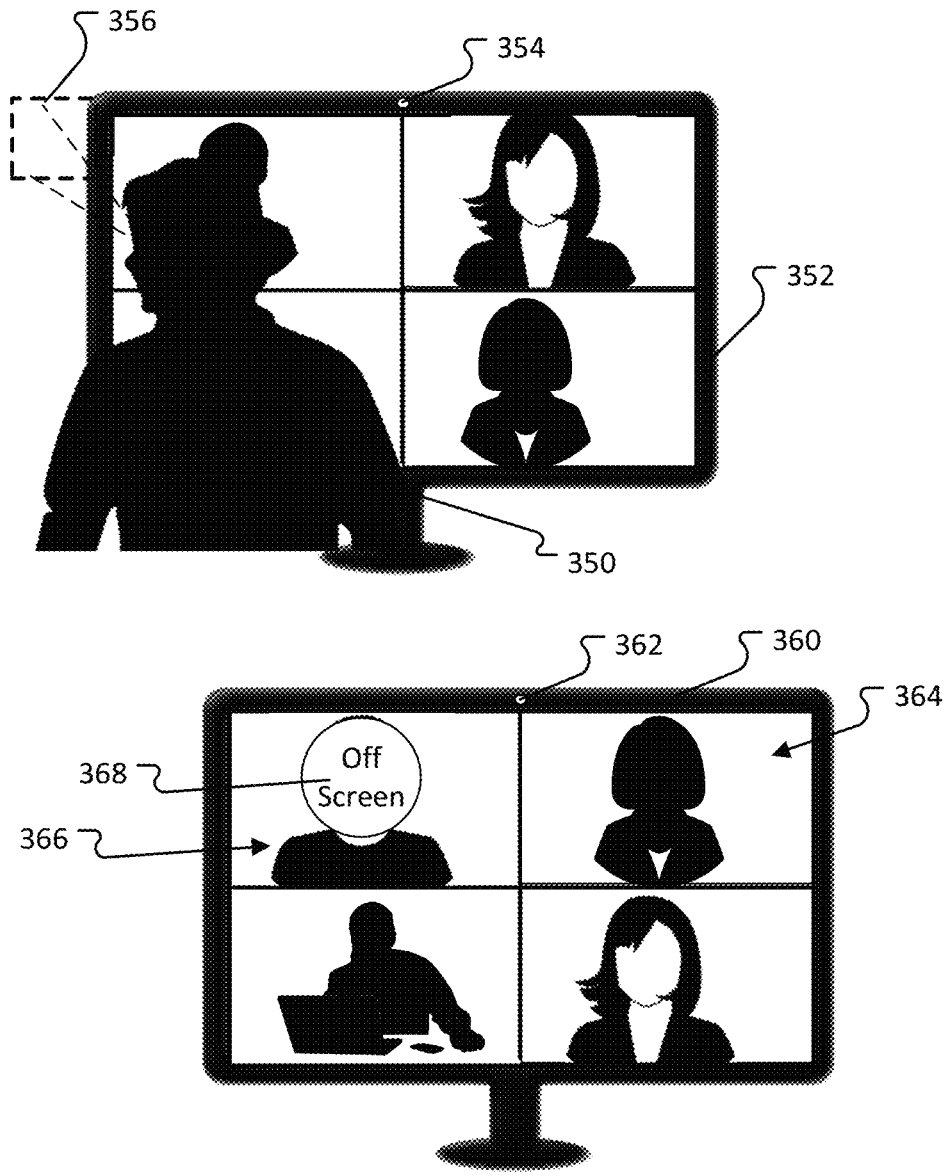
FIG. 3D depicts a fourth example of applying a gaze adjustment technique in accordance with examples of the present disclosure.

FIG. 3D depicts a fourth example of applying a gaze adjustment technique in accordance with examples of the present disclosure. As depicted in FIG. 3D, a participant 350 may be viewing a conferencing session at a display device 352. The display device 352 may include an integrated camera 354 for acquiring a video stream, an image, or a stream of images of the participant 350. A gaze tracker, for example the gaze tracker 221, may utilize one or more of the images to determine that the gaze 356 of the participant 350 is directed to a location that is not at the display device 352 and appears to be off screen.

In examples, a compositor of the participant's 350 computing system, may access information indicating that in the participant's 350 video conferencing session, a location where the gaze 356 of the participant 350 is directed appears to be located off screen. Accordingly, the gaze tracker associated with the participant 350 may provide a source-target pair that includes (participant 350, Off Screen) to the gaze coordinator 222. The gaze coordinator 222 for example, may then provide information including adjustment information for one or more of the participants in the video conferencing session.

In examples, a third participant may be viewing the conferencing session at a display device 360. The display device 360 may include an integrated camera 362 for acquiring a video stream, an image, or a stream of images of the third participant. A gaze adjuster associated with a computing system of the third participant, for example gaze adjuster 224, may receive the information from the gaze coordinator 222, receive location information specific to the layout 364, and determine that the participant 350 is depicted at location 366. The gaze adjuster 224 may adjust the gaze, if needed, in a depiction of the participant 350 such that the participant 350 appears to be looking away from the screen or otherwise appears to be looking at a location away from the screen. In some examples, if the participant 350 is looking away, no adjustment by the gaze adjuster 224 may be necessary. In some examples, the gaze adjuster 224 may include a graphic or other indication 368 over the depiction of the participant 350 to indicate that the participant 350 is looking away from the display device 360. Alternatively, the gaze adjuster 224 may adjust the gaze in a depiction of the participant 350 such that the participant 350 appears to be looking straight at a camera 362 to show engagement; the gaze adjuster 224 may perform such adjustment according to a user preference.

Figure 4:
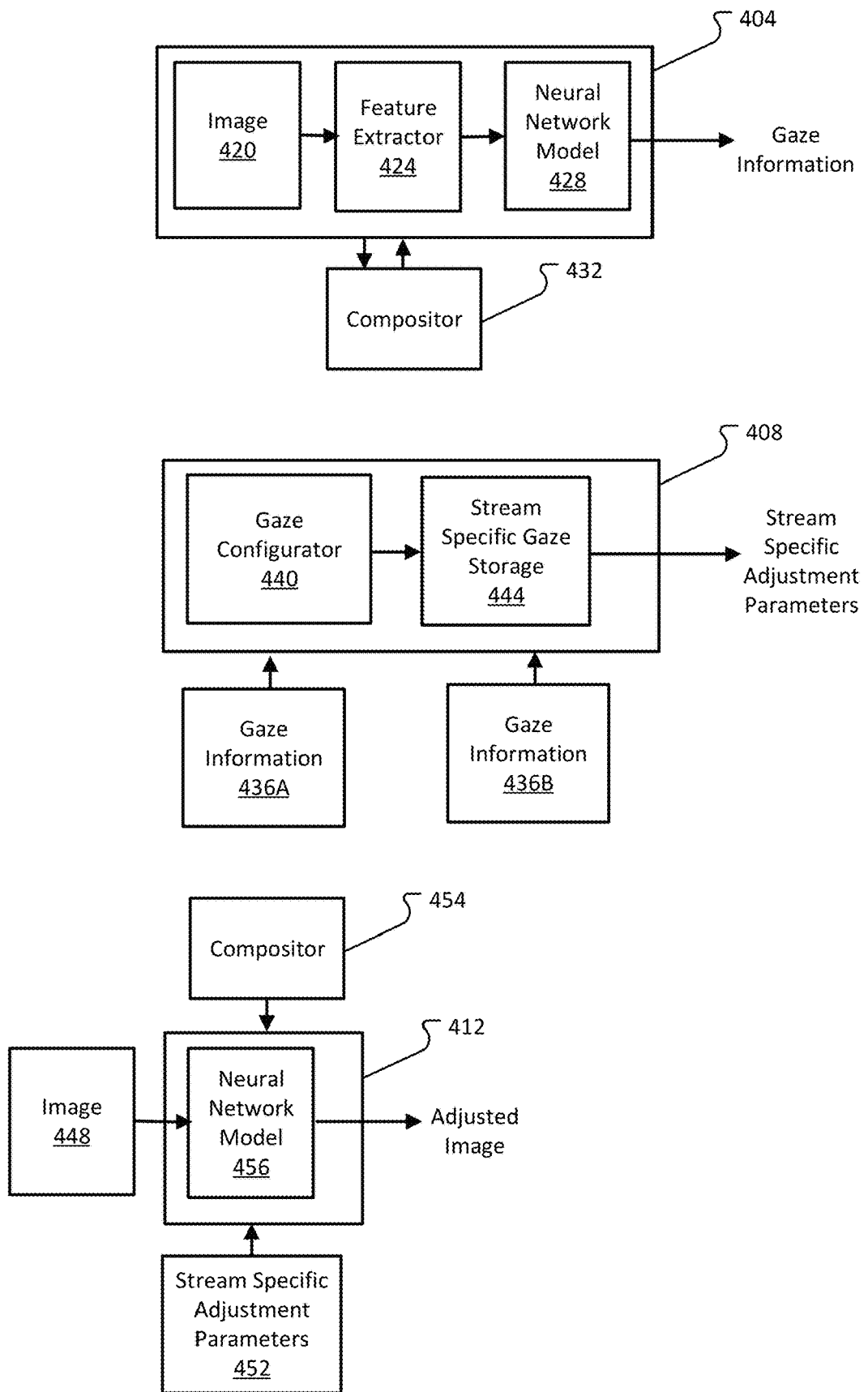
FIG. 4 depicts additional details of a gaze tracker, a gaze coordinator, and a gaze adjuster in accordance with examples of the present disclosure

FIG. 4 depicts additional details of a gaze tracker 404, a gaze coordinator 408, and a gaze adjuster 412 in accordance with examples of the present disclosure. The gaze tracker 404 may be the same as or similar to the gaze tracker 221 of FIG. 2. In some examples, the gaze tracker 404 may execute processing at a CPU and/or at an neural processing unit (NPU). For example, processing of the gaze tracker 404 may occur at an NPU configured to efficiently execute processing associated with neural network models, such as the gaze tracker 404. Accordingly, the gaze tracker 404 may operate in or near real-time such that a gaze of a participant may be detected in or near real-time without consuming resources traditionally expended by a CPU.

The gaze tracker 404 may receive one or more images 420 from an image sensor of a camera, for example camera 126. The gaze tracker 404 may take the received one or more images 420, and extract one or more features from the image 420 using the feature extractor 424. For example the feature extractor 424 may determine and/or detect a user's face and extract feature information such as, but not limited to, a location of a user's, eyes, pupils, nose, chin, ears etc. In examples, the extracted information may be provided to a neural network model 428, where the neural network model may provide gaze information as an output. In examples, the neural network model may include but is not limited to a transformer model, a convolutional neural network model, and/or a support vector machine model. The gaze information may include coordinates, (e.g., x,y,z coordinates) of a participant's gaze in relation to an origin point on a display associated with a computing device. In examples, a compositor 432 residing at a same computing system as the gaze tracker 404 for example, may provide an identity of a participant to which the gaze information is directed and/or otherwise indicate that the gaze information for a participant is away from a display device. Accordingly, the gaze information may include source-target pair information.

The gaze coordinator 408 may be the same as or similar to the gaze coordinator 222 of FIG. 2. The gaze coordinator 408 may receive a plurality of gaze information 436A, 436B. A gaze configurator 440 may determine specific gaze parameters for each participant, store such information in a storage 444, and then provide said information as stream specific adjustment parameters to a gaze adjustor 414. In examples, the specific parameters for each participant may include but is not limited to source-pair information, gaze adjustment features information (e.g., eye gaze, pose, position, body movement etc.) and/or whether a gaze associated with a participant requires adjustment. In some examples, a gaze associated with one participant displayed at a first display device may not need adjusting while a gaze associated with the same participant but displayed at a second different device may need adjusting. Accordingly, the adjustment parameters may be specific to each stream.

The gaze adjuster 412 may be the same as or similar to the gaze adjuster 224 if FIG. 2. In examples, the gaze adjuster may receive an image 448 of a participant as part of a video stream; the stream specific adjustment parameters 452 may also be received. In examples, the compositor 454 local to the computing system executing the gaze adjuster 412 may provide location information specific to a displayed layout identifying a location within the displayed layout at which the received image 448 is to be depicted. A neural network model 456 may receive the location information and adjustment parameters 452 and perform a gaze adjustment as previously described. The adjusted image may then be provided as output for display in the displayed layout at the identified location. In some examples, the gaze adjuster 412 may execute processing at a CPU and/or at an neural processing unit (NPU). For example, processing of the image 448 by the neural network model 456 may occur at an NPU configured to efficiently execute processing associated with neural network models, such as the gaze adjuster 412. Accordingly, the gaze adjuster 412 may operate in or near real-time such that a gaze of a participant may be adjusted in or near real-time without consuming resources traditionally expended by a CPU.

Figure 5:
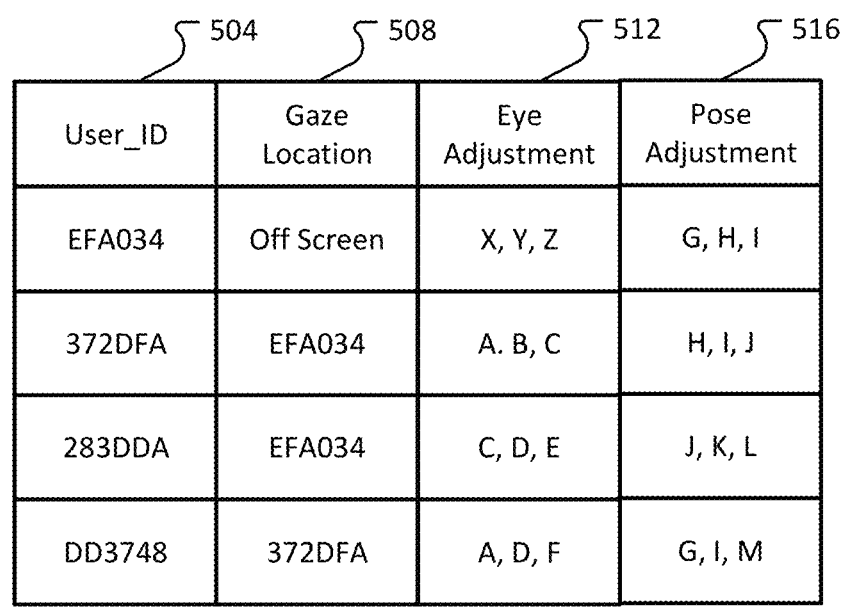
FIG. 5 depicts a data structure in accordance with examples of the present disclosure.

FIG. 5 depicts a data structure 502 in accordance with examples of the present disclosure. The data structure 502 may be provided from a gaze coordinator, for example the gaze coordinator 222. The data structure 502 may include additional or fewer fields than those that are depicted. In examples, a first field 504 may include information uniquely identifying a user. The second field 508 of the data structure 502 may provide information for a gaze target for the user identified in the first field 504. The fields 512 and 516 may include adjustment information for one or more adjustment parameters. Although eye adjustment parameters 512 and pose adjustment parameters 516 are depicted, it is understood that the data structure 502 may include additional adjustment parameters. The adjustment parameters 512 and 516 may be specific to a computing system at which one or more video streams including user identified by the first field 504 are received. In examples, information in the data structure 502 may be provided to an adjuster, such as the gaze adjuster 224; the adjuster may then adjust one or more images associated with a participant in accordance with the information in the data structure 502.

Figure 6:
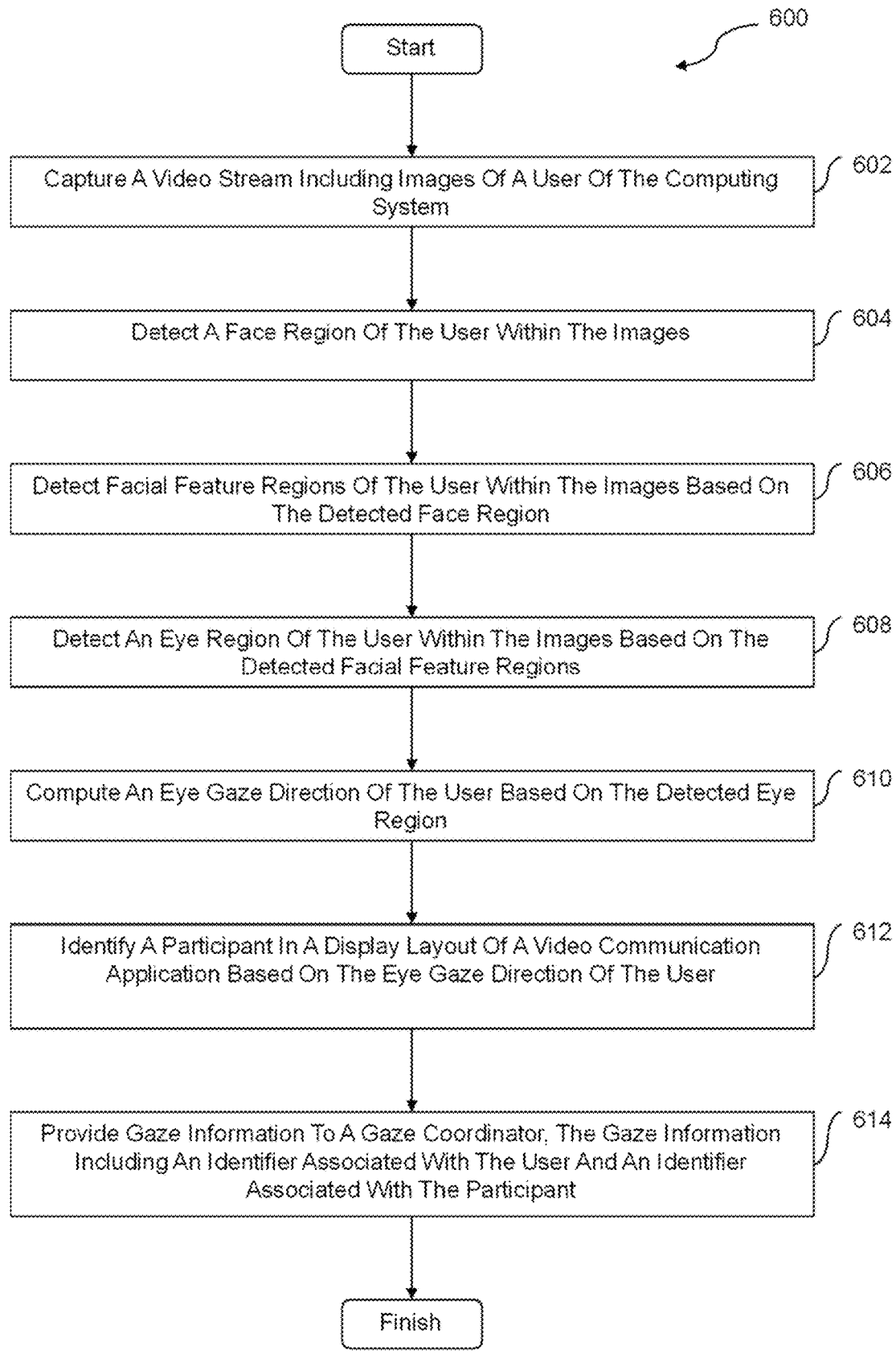
FIG. 6 depicts details of a method for making gaze adjustments to participants in a video communication session using a video conferencing application.

FIG. 6 depicts details of a method 600 for making gaze adjustments to participants in a video communication session using a video conferencing application. A general order for the steps of the method 600 is shown in FIG. 6. Generally, the method 600 starts at 602 and ends at 614. The method 600 may include more or fewer steps or may arrange the order of the steps differently than those shown in FIG. 6. The method 600 can be executed as a set of computer-executable instructions executed by a computer system and encoded or stored on a computer readable medium. In examples, aspects of the method 600 are performed by one or more processing devices, such as a computing system or server. Further, the method 600 can be performed by gates or circuits associated with a processor, Application Specific Integrated Circuit (ASIC), a field programmable gate array (FPGA), a system on chip (SOC), a neural processing unit, or other hardware device. Hereinafter, the method 600 shall be explained with reference to the systems, components, modules, software, data structures, user interfaces, etc. described in conjunction with FIGS. 1-5.

The method starts and flow proceeds to 602. At 602, the method may capture, via a camera of a computing system, a video stream comprising images of a user of the computing system. For example, a camera, such as camera 126 (FIG. 1) may acquire a video stream of user 112. The method may proceed to 604, where a face region within the images may be detected using a processor of the computing system. The method may proceed to 606, where one or more facial feature regions of the user may be detected. The method may proceed 608, where an eye region of the user within the images may be detected. For example, in steps 604-610, one or more features from the acquired image may be provided to a feature extractor. The feature extractor may determine and/or detect a user's face and extract feature information such as, but not limited to, a location of a user's, eyes, pupils, nose, chin, ears etc. In examples, the extracted information may be provided to a neural network model, where the neural network model may provide a computed gaze direction as an output. In examples, the neural network model may include but is not limited to a transformer model, a convolutional neural network model, and/or a support vector machine model.

In examples where the video stream is acquired by an external camera, such as camera 124, the feature extractor may rely on a previously performed calibration step that resolves a position and orientation of the external camera 124 in relation to the user. In some examples, the calibration step may be an explicit calibration step requiring the user to view various locations highlighted or otherwise identified at a display device. In other examples, the calibration may be ongoing, for example, by pairing on-screen selections made by the user with extracted feature information corresponding to the user's eyes, pupils, nose, chin, ears, etc. Accordingly, extracted feature information can be obtained and the neural network model can determine a gaze direction of the user as an output using an external camera 124.

The method 600 may proceed to 612, where a participant within a layout of the communication application may be identified. For example, a compositor may receive a computed eye gaze direction of the user and determine that the eye gaze direction is directed to a first participant. In examples, the compositor may provide a gaze detector an identity of the participant. Accordingly, at 614, the gaze detector may provide the gaze information, including a source-target pair for example, to a gaze coordinator. The method 600 may then end.

In examples, the gaze coordinator may determine what gaze information is to be provided to which computing device based at least on a user associated with the computing device. Thus, the gaze coordinator may provide gaze information for a first plurality of participants displayed at a layout of a computing system for a first user, and information for a second plurality of participants displayed at a layout of a computing system for a second user.

Figure 7:
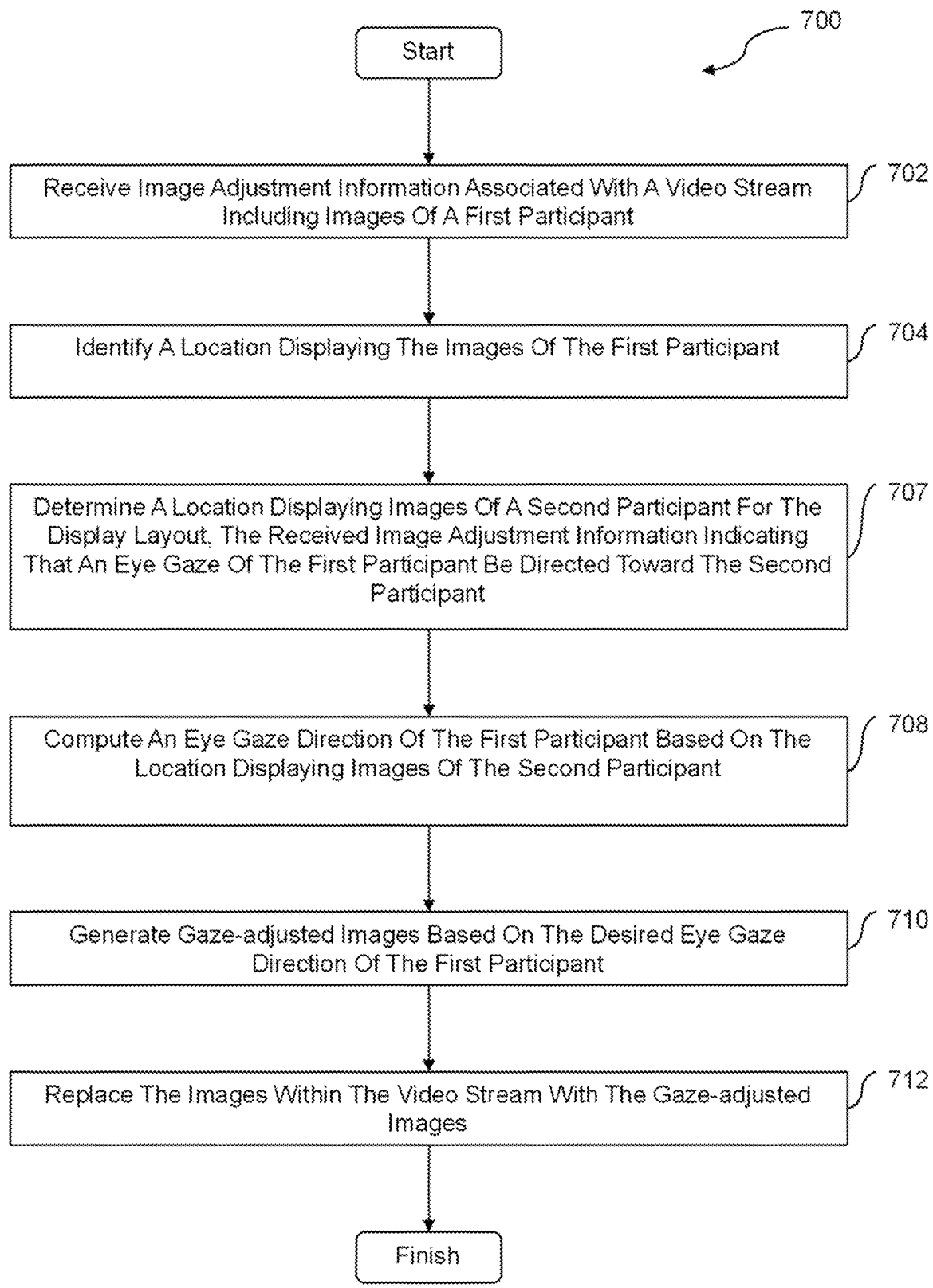
FIG. 7 depicts details of a method for making gaze adjustments to participants in a video communication session using a video conferencing application.

FIG. 7 depicts details of a method 700 for making gaze adjustments to participants in a video communication session using a video conferencing application. A general order for the steps of the method 700 is shown in FIG. 7. Generally, the method 700 starts at 702 and ends at 712. The method 700 may include more or fewer steps or may arrange the order of the steps differently than those shown in FIG. 7. The method 700 can be executed as a set of computer-executable instructions executed by a computer system and encoded or stored on a computer readable medium. In examples, aspects of the method 700 are performed by one or more processing devices, such as a computing system or server. Further, the method 700 can be performed by gates or circuits associated with a processor, Application Specific Integrated Circuit (ASIC), a field programmable gate array (FPGA), a system on chip (SOC), a neural processing unit, or other hardware device. Hereinafter, the method 700 shall be explained with reference to the systems, components, modules, software, data structures, user interfaces, etc. described in conjunction with FIGS. 1-6.

The method starts and flow proceeds to 702. At 702, the method may receive, at computing system, image adjustment information associated with a video stream including images of a first participant. In examples, the image adjustment information may be received from the gaze coordinator, for example the gaze coordinator 222. The 700 may proceed to 704, where a compositor and/or gaze adjustor may identify, for a display layout of a communication application, a location displaying the images of the first participant. For example, the image adjustment information may include source-target information. A compositor, for example the compositor 223 of FIG. 2, may determine or otherwise identify a location within the display layout of the communication application, that is displaying images of the first participant. The method 700 may then proceed to 707, to determine, based on the received image adjustment information, a location within the display layout that displays images of a second participant. As previously mentioned, the received image adjustment information may indicate a target as part of the source-target information. A compositor, for example the compositor 223 of FIG. 2, may determine or otherwise identify a location within the display layout of the communication application, that is displaying images of the second participant. The method 700 may proceed to 707 to compute an eye gaze direction of the first participant based on the location displaying images of the second participant. The method 700 may then proceed to 710 and generate gaze-adjusted images based on the desired eye gaze direction of the first participant. In examples, an image from an original video stream (e.g., a non-gaze adjusted video stream) may be received and provided to a neural network. For example, the neural network model 456 may receive the image and generate a gaze-adjusted image. At 712, the generated gaze adjusted image may replace the original image(s) within the video stream.

Figure 8A:
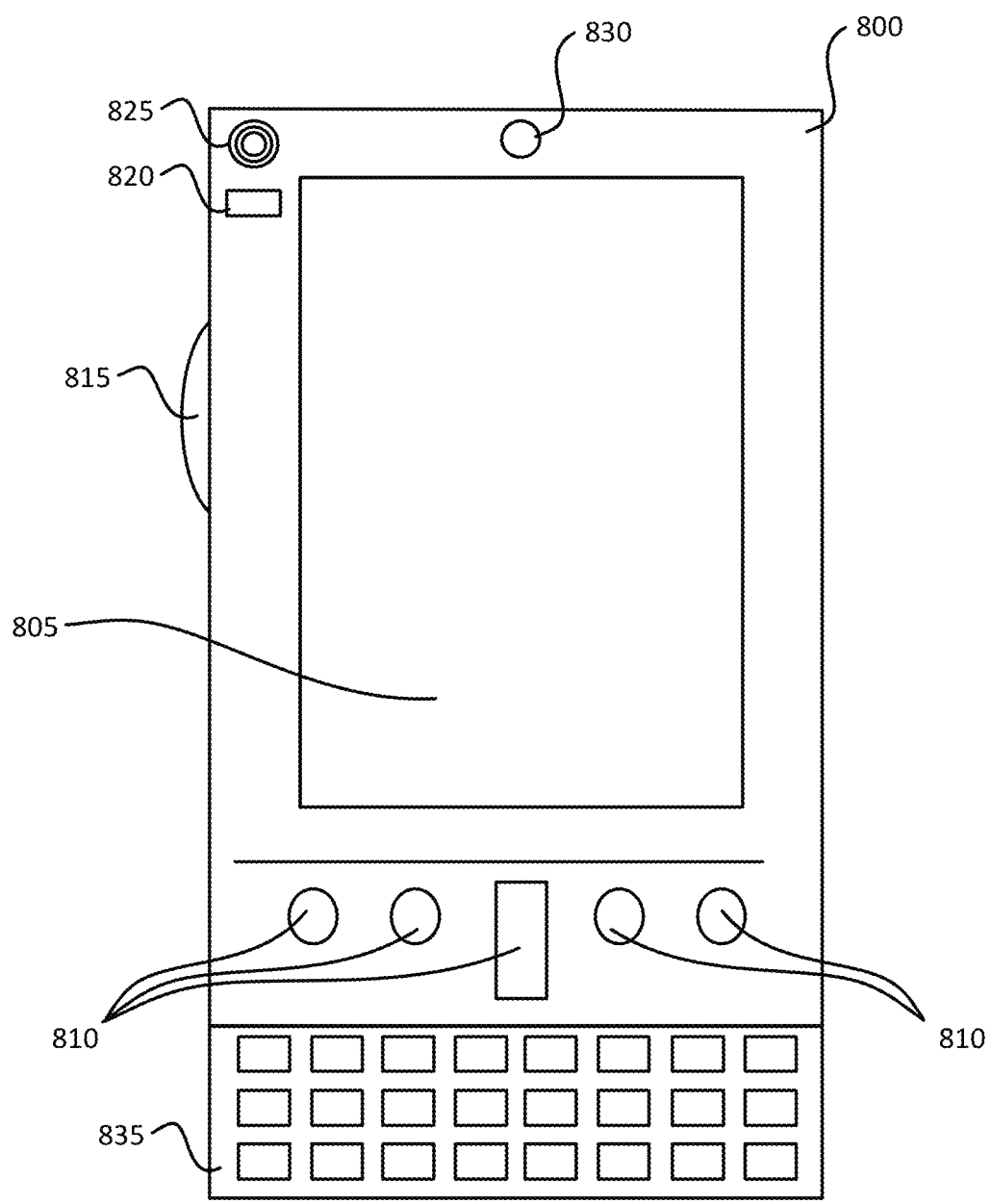
FIGS. 8A-8B depict details of one or more computing systems in accordance with examples of the present disclosure.
Figure 8B:
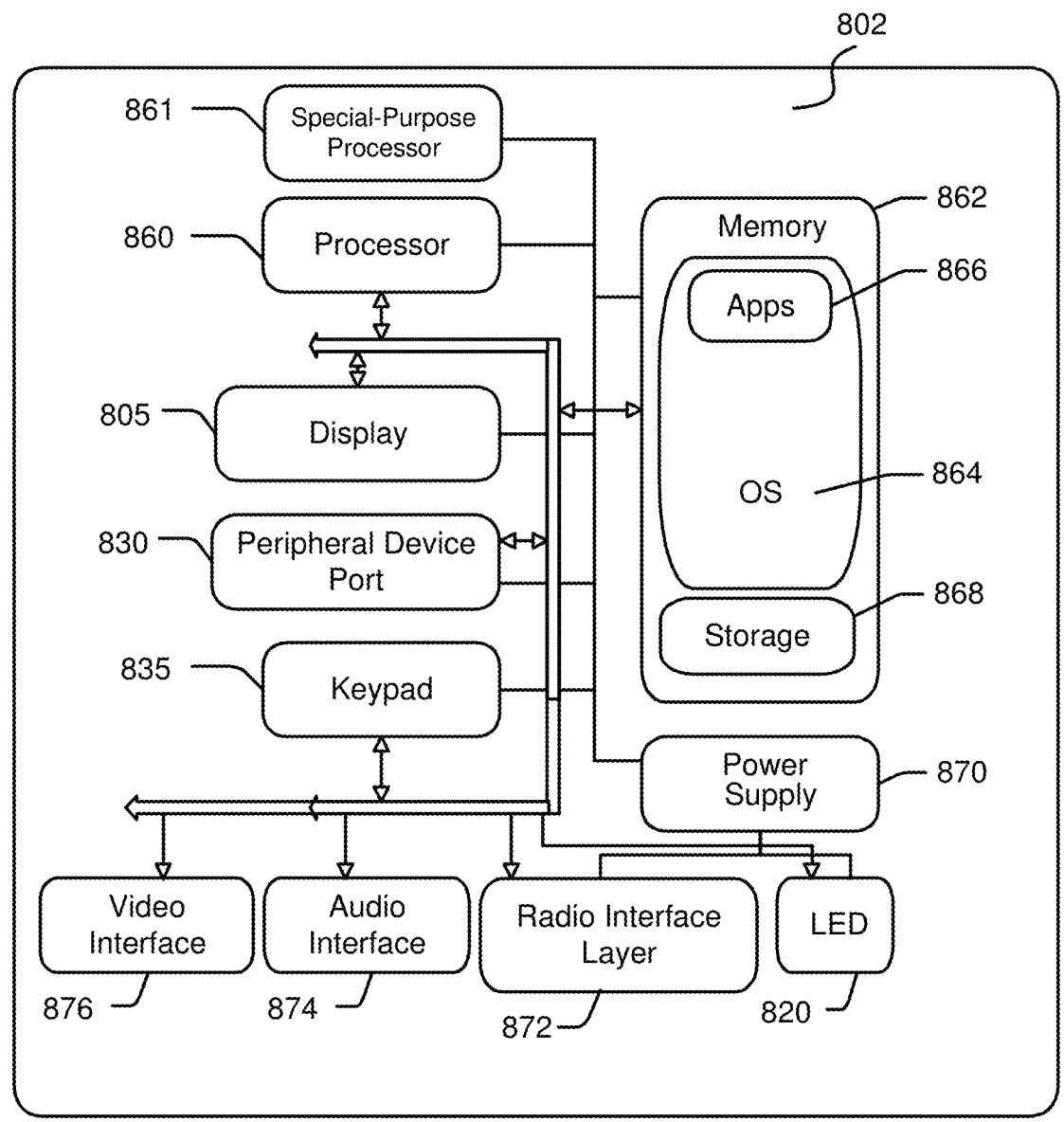
Figure 9:
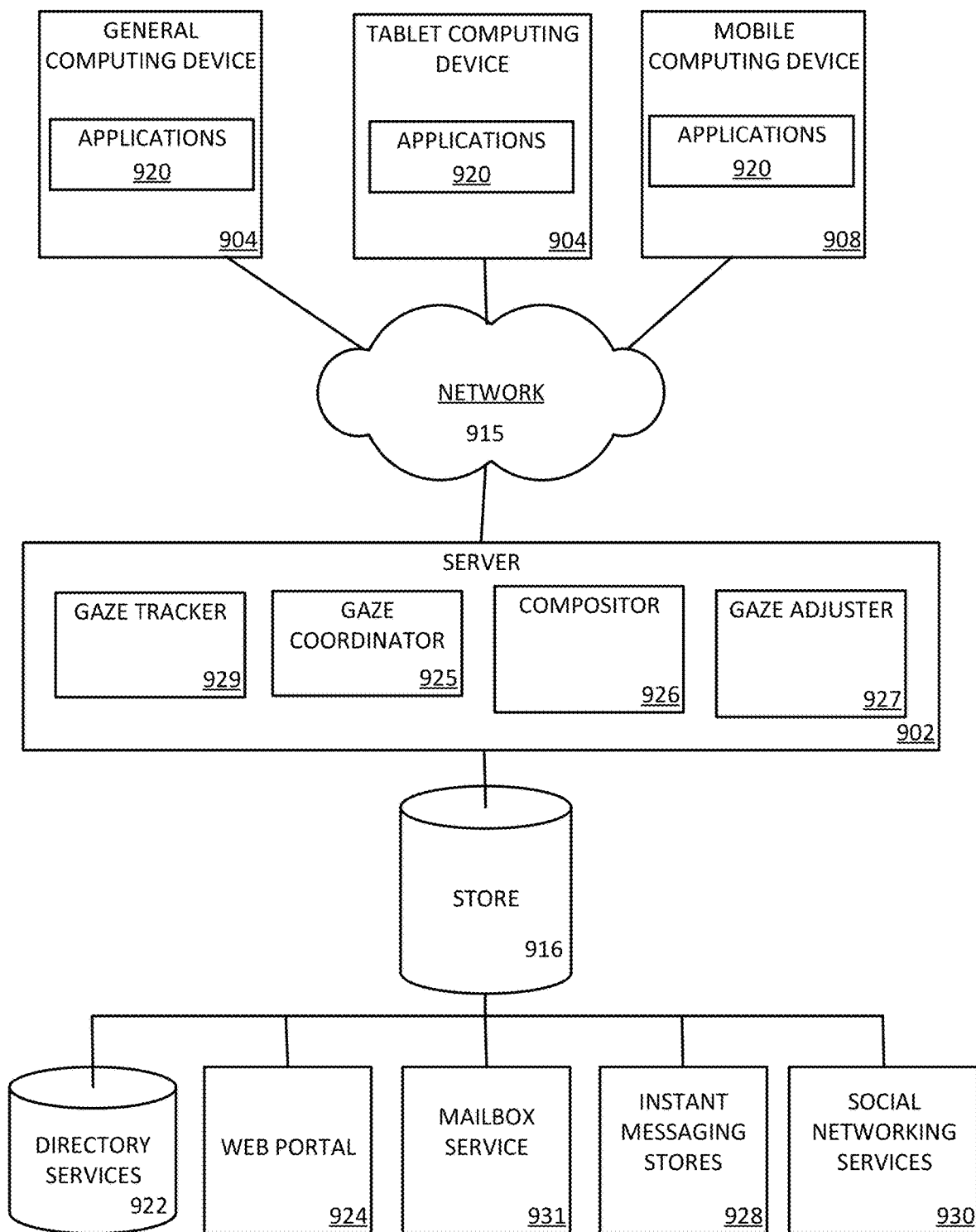
FIG. 9 depicts an architecture of a system for processing data received at a computing system in accordance with examples of the present disclosure.

FIG. 8A, FIG. 8B, FIG. 9 and the associated descriptions provide a discussion of a variety of operating environments in which aspects of the disclosure may be practiced. However, the devices and systems illustrated and discussed with respect to FIGS. 8A-9 are for purposes of example and illustration and are not limiting of a vast number of computing device configurations that may be utilized for practicing aspects of the disclosure, described herein.

FIGS. 8A-8B illustrate a mobile computing device 800, for example, a mobile telephone, a smart phone, wearable computer (such as a smart watch), a tablet computer, a laptop computer, and the like, with which embodiments of the disclosure may be practiced. In some respects, the client may be a mobile computing device. With reference to FIG. 8A, one aspect of a mobile computing device 800 for implementing the aspects is illustrated. In a basic configuration, the mobile computing device 800 is a handheld computer having both input elements and output elements. The mobile computing device 800 typically includes a display 805 and one or more input buttons 810 that allow the user to enter information into the mobile computing device 800. The display 805 of the mobile computing device 800 may also function as an input device (e.g., a touch screen display).

If included, an optional side input element 815 allows further user input. The side input element 815 may be a rotary switch, a button, or any other type of manual input element. In alternative aspects, mobile computing device 800 may incorporate greater or fewer input elements. For example, the display 805 may not be a touch screen in some embodiments.

In yet another alternative embodiment, the mobile computing device 800 is a portable phone system, such as a cellular phone. The mobile computing device 800 may also include an optional keypad 835. Optional keypad 835 may be a physical keypad or a "soft" keypad generated on the touch screen display.

In various embodiments, the output elements include the display 805 for showing a graphical user interface (GUI), a visual indicator 820 (e.g., a light emitting diode), and/or an audio transducer 825 (e.g., a speaker). In some aspects, the mobile computing device 800 incorporates a vibration transducer for providing the user with tactile feedback. In yet another aspect, the mobile computing device 800 incorporates input and/or output ports, such as an audio input (e.g., a microphone jack), an audio output (e.g., a headphone jack), and a video output (e.g., a HDMI port) for sending signals to or receiving signals from an external device.

FIG. 8B is a block diagram illustrating the architecture of one aspect of a mobile computing device. That is, the mobile computing device 800 can incorporate a system (e.g., an architecture) 802 to implement some aspects. In one embodiment, the system 802 is implemented as a "smart phone" capable of running one or more applications (e.g., browser, e-mail, calendaring, contact managers, messaging clients, games, and media clients/players). In some aspects, the system 802 is integrated as a computing device, such as an integrated personal digital assistant (PDA) and wireless phone.

One or more application programs 866 may be loaded into the memory 862 and run on or in association with the operating system 864. Examples of the application programs include phone dialer programs, video conferencing applications, e-mail programs, personal information management (PIM) programs, word processing programs, spreadsheet programs, Internet browser programs, messaging programs, maps programs, and so forth. The system 802 also includes a non-volatile storage area 868 within the memory 862. The non-volatile storage area 868 may be used to store persistent information that should not be lost if the system 802 is powered down. The application programs 866 may use and store information in the non-volatile storage area 868, such as e-mail or other messages used by an e-mail application, and the like. A synchronization application (not shown) also resides on the system 802 and is programmed to interact with a corresponding synchronization application resident on a host computer to keep the information stored in the non-volatile storage area 868 synchronized with corresponding information stored at the host computer. As should be appreciated, other applications may be loaded into the memory 862 and run on the mobile computing device 800 described herein (e.g., search engine, extractor module, relevancy ranking module, answer scoring module, etc.).

The system 802 has a power supply 870, which may be implemented as one or more batteries. The power supply 870 might further include an external power source, such as an AC adapter or a powered docking cradle that supplements or recharges the batteries.

The system 802 may also include a radio interface layer 872 that performs the function of transmitting and receiving radio frequency communications. The radio interface layer 872 facilitates wireless connectivity between the system 802 and the "outside world," via a communications carrier or service provider. Transmissions to and from the radio interface layer 872 are conducted under control of the operating system 864. In other words, communications received by the radio interface layer 872 may be disseminated to the application programs 866 via the operating system 864, and vice versa.

The visual indicator 820 may be used to provide visual notifications, and/or an audio interface 874 may be used for producing audible notifications via the audio transducer 825. In the illustrated embodiment, the visual indicator 820 is a light emitting diode (LED) and the audio transducer 825 is a speaker. These devices may be directly coupled to the power supply 870 so that when activated, they remain on for a duration dictated by the notification mechanism even though the processor 860 and other components might shut down for conserving battery power. The LED may be programmed to remain on indefinitely until the user takes action to indicate the powered-on status of the device. The audio interface 874 is used to provide audible signals to and receive audible signals from the user. For example, in addition to being coupled to the audio transducer 825, the audio interface 874 may also be coupled to a microphone to receive audible input, such as to facilitate a telephone conversation. In accordance with embodiments of the present disclosure, the microphone may also serve as an audio sensor to facilitate control of notifications, as will be described below. The system 802 may further include a video interface 876 that enables an operation of an on-board camera 830 to record still images, video stream, and the like. The onboard camera may be the same as or similar to the previously described cameras 122, and 126.

A mobile computing device 800 implementing the system 802 may have additional features or functionality. For example, the mobile computing device 800 may also include additional data storage devices (removable and/or non-removable) such as, magnetic disks, optical disks, or tape. Such additional storage is illustrated in FIG. 8B by the non-volatile storage area 868.

Data/information generated or captured by the mobile computing device 800 and stored via the system 802 may be stored locally on the mobile computing device 800, as described above, or the data may be stored on any number of storage media that may be accessed by the device via the radio interface layer 872 or via a wired connection between the mobile computing device 800 and a separate computing device associated with the mobile computing device 800, for example, a server computer in a distributed computing network, such as the Internet. As should be appreciated such data/information may be accessed via the mobile computing device 800 via the radio interface layer 872 or via a distributed computing network. Similarly, such data/information may be readily transferred between computing devices for storage and use according to well-known data/information transfer and storage means, including electronic mail and collaborative data/information sharing systems.

FIG. 9 illustrates one aspect of the architecture of a system for processing data received at a computing system from a remote source, such as a personal computer 904, tablet computing device 906, or mobile computing device 908, as described above. The personal computer 904, tablet computing device 906, or mobile computing device 908 may include one or more applications 920; such applications may include but are not limited to the a gaze tracker 929, a gaze coordinator 925, a compositor 926, and a gaze adjuster 927. The gaze tracker 929 may be the same as or similar to the gaze tracker 221 of FIG. 2. The gaze coordinator 925 may be the same as or similar to the gaze coordinator 222 of FIG. 2. The compositor 926 may be the same as or similar to the compositor 223 of FIG. 2. The gaze adjuster 927 may be the same as or similar to the gaze adjuster 224 of FIG. 2. Content at a server device 902 may be stored in different communication channels or other storage types. For example, various documents may be stored using a directory service 922, a web portal 924, a mailbox service 931, an instant messaging store 928, or social networking services 930.

One or more of the previously described program modules 206 or software applications 220 may be employed by server device 902 and/or the personal computer 904, tablet computing device 906, or mobile computing device 908, as described above. For example, the server device 902 may include such applications may include but are not limited to the a gaze tracker 929, a gaze coordinator 925, a compositor 926, and a gaze adjuster 927. The gaze tracker 929 may be the same as or similar to the gaze tracker 221 of FIG. 2. The gaze coordinator 925 may be the same as or similar to the gaze coordinator 222 of FIG. 2. The compositor 926 may be the same as or similar to the compositor 223 of FIG. 2. The gaze adjuster 927 may be the same as or similar to the gaze adjuster 224 of FIG. 2.

The server device 902 may provide data to and from a client computing device such as a personal computer 904, a tablet computing device 906 and/or a mobile computing device 908 (e.g., a smart phone) through a network 915. By way of example, the computer system described above may be embodied in a personal computer 904, a tablet computing device 906 and/or a mobile computing device 908 (e.g., a smart phone). Any of these embodiments of the computing devices may obtain content from the store 916, in addition to receiving graphical data useable to be either pre-processed at a graphic-originating system, or post-processed at a receiving computing system.

In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

The present disclosure relates to systems and methods for adjusting a gaze of a depicted image of a user and/or participant in a video stream according to at least the examples provided in the sections below:

(A1) In accordance with at least one example of the present disclosure, a method includes: receiving, at computing system, image adjustment information associated with a video stream including images of a first participant; identifying, for a display layout of a communication application, a location displaying the images of the first participant; determining, based on the received image adjustment information, a location displaying images of a second participant for the display layout, the received image adjustment information indicating that an eye gaze of the first participant being directed toward the second participant; computing an eye gaze direction of the first participant based on the location displaying images of the second participant; generating gaze-adjusted images based on the eye gaze direction of the first participant, wherein the gaze-adjusted images include at least one of an adjusted eye gaze direction of the first participant or an adjusted head pose of the first participant; and replacing the images within the video stream with the gaze-adjusted images.

(A2) In accordance with at least one aspect of A1 above, the method further includes capturing, via a camera of the computing system, a second video stream including images of a user of the computing system; detecting, via a processor of the computing system, a face region of the user within the images; detecting facial feature regions of the user within the images based on the detected face region; detecting an eye region of the user within the images based on the detected facial feature regions; computing an eye gaze direction of the user based on the detected eye region; identifying a third participant in the display layout based on the eye gaze direction of the user; and providing gaze information to a gaze coordinator, the gaze information including an identifier associated with the user and an identifier associated with the third participant.

(A3) In accordance with at least one aspect of at least one of A1-A2 above, the method further includes computing an eye gaze direction of the third participant based on received image adjustment information associated with a second video stream including images of the third participant; generating second gaze-adjusted images based on the eye gaze direction of the third participant; and replacing the images within the second video stream with the second gaze-adjusted images.

(A4) In accordance with at least one aspect of at least one of A1-A3 above, the method further includes generating second gaze-adjusted images based on eye gaze direction of a third participant be directed toward a location other than a display device displaying a graphical user interface of the communication application, the second gaze-adjusted images including a graphic; and replacing the images within a second video stream including images of the third participant with the second gaze-adjusted images.

(A5) In accordance with at least one aspect of at least one of A1-A4 above, the method further includes changing an appearance of the eyes of the first participant based on estimates of a head pose; and changing an appearance of the first participant's head and torso by rotating the first participant's head and torso to generate the gaze-adjusted images.

(A6) In accordance with at least one aspect of at least one of A1-A5 above, the image adjustment information is specific to a participant video stream and the computing system.

(A7) In accordance with at least one aspect of at least one of A1-A6 above, the user has not shared the user's video stream.

In yet another aspect, some examples include a computing system including one or more processors and memory coupled to the one or more processors, the memory storing one or more programs configured to be executed by the one or more processors, the one or more programs including instructions for performing any of the methods described herein (e.g., A1-A7 described above).

In yet another aspect, some examples include a non-transitory computer-readable storage medium storing one or more programs for execution by one or more processors of a storage device, the one or more programs including instructions for performing any of the methods described herein (e.g., A1-A7 described above).

The present disclosure relates to systems and methods for adjusting a gaze of a depicted image of a user and/or participant in a video stream according to at least the examples provided in the sections below:

(B1) In accordance with at least one example of the present disclosure, a method includes: receiving, at computing system, image adjustment information associated with a video stream including images of a first participant; identifying, for a display layout of a communication application, a location displaying the images of the first participant; determining, based on the received image adjustment information, a location displaying images of a second participant for the display layout, the received image adjustment information indicating that an eye gaze of the first participant be directed toward the second participant; computing an eye gaze direction of the first participant based on the location displaying images of the second participant; generating gaze-adjusted images based on the eye gaze direction of the first participant, wherein the gaze-adjusted images include at least one of an adjusted eye gaze direction of the first participant or an adjusted head pose of the first participant; and replacing the images within the video stream with the gaze-adjusted images.

(B2) In accordance with at least one aspect of B1 above, the method includes capturing, via a camera of the computing system, a second video stream including images of a user of the computing system; detecting, via a processor of the computing system, a face region of the user within the images; detecting facial feature regions of the user within the images based on the detected face region; detecting an eye region of the user within the images based on the detected facial feature regions; computing an eye gaze direction of the user based on the detected eye region; identifying a third participant in the display layout based on the eye gaze direction of the user; and providing gaze information to a gaze coordinator, the gaze information including an identifier associated with the user and an identifier associated with the third participant.

(B3) In accordance with at least one aspect of at least one of B1-B2 above, the method includes: computing an eye gaze direction of the third participant based on received image adjustment information associated with a second video stream including images of the third participant; generating second gaze-adjusted images based on the eye gaze direction of the third participant; and replacing the images within the second video stream with the second gaze-adjusted images.

(B4) In accordance with at least one aspect of at least one of B1-B3 above, the method includes: generating second gaze-adjusted images based on eye gaze direction of a third participant be directed toward a location other than a display device displaying a graphical user interface of the communication application, the second gaze-adjusted images including a graphic; and replacing the images within a second video stream including images of the third participant with the second gaze-adjusted images.

(B5) In accordance with at least one aspect of at least one of B1-B4 above, the method includes changing an appearance of the eyes of the first participant based on estimates of a head pose; and changing an appearance of the first participant's head and torso by rotating the first participant's head and torso to generate the gaze-adjusted images.

(B6) In accordance with at least one aspect of at least one of B1-B5 above, the image adjustment information is specific to a participant video stream and the computing system.

(B7) In accordance with at least one aspect of at least one of B1-B6 above, a user of the computing system has not shared the user's video stream.

In yet another aspect, some embodiments include a computing system including one or more processors and memory coupled to the one or more processors, the memory storing one or more programs configured to be executed by the one or more processors, the one or more programs including instructions for performing any of the methods described herein (e.g., B1-B7 described above).

In yet another aspect, some embodiments include a non-transitory computer-readable storage medium storing one or more programs for execution by one or more processors of a storage device, the one or more programs including instructions for performing any of the methods described herein (e.g., B1-B7 described above).

The present disclosure relates to systems and methods for adjusting a gaze of a depicted image of a user and/or participant in a video stream according to at least the examples provided in the sections below:

(C1) In accordance with at least one example of the present disclosure, a method includes: capturing, via a camera of a computing system, a video stream including images of a user of the computing system; detecting, via a processor of the computing system, a face region of the user within the images; detecting facial feature regions of the user within the images based on the detected face region; detecting an eye region of the user within the images based on the detected facial feature regions; computing an eye gaze direction of the user based on the detected eye region; identifying a participant in a display layout of a video communication application based on the eye gaze direction of the user; and providing gaze information to a gaze coordinator, the gaze information including an identifier associated with the user and an identifier associated with the participant.

(C2) In accordance with at least one aspect of C1 above, the method includes receiving, at the computing system, image adjustment information associated with a video stream including images of a second participant; identifying, based on the display layout of the video communication application, a location displaying the images of the second participant; determining, based on the received image adjustment information, a location displaying images of a third participant for the display layout, the received image adjustment information indicating that an eye gaze of the second participant is directed toward the third participant; computing an eye gaze direction of the second participant based on the location displaying images of the third participant; generating gaze-adjusted images based on the eye gaze direction of the second participant, wherein the gaze-adjusted images include at least one of an adjusted eye gaze direction of the second participant or an adjusted head pose of the second participant; and replacing the images within the video stream with the gaze-adjusted images.

(C3) In accordance with at least one aspect of at least one of C1-C2 above, the method includes: generating gaze-adjusted images based on an eye gaze direction of a second participant being directed toward a location other than a display device displaying a graphical user interface of the communication application, the gaze-adjusted images including a graphic; and replacing the images within a second video stream including images of the second participant with the gaze-adjusted images.

(C4) In accordance with at least one aspect of at least one of C1-C3 above, the method includes changing an appearance of the user's head and torso by rotating the user's head and torso in an image to generate the gaze-adjusted images.

(C5) In accordance with at least one aspect of at least one of C1-C4 above, the image adjustment information is specific to a participant video stream and the computing system.

(C6) In accordance with at least one aspect of at least one of C1-05 above, the user has not shared the user's video stream.

In yet another aspect, some embodiments include a computing system including one or more processors and memory coupled to the one or more processors, the memory storing one or more programs configured to be executed by the one or more processors, the one or more programs including instructions for performing any of the methods described herein (e.g., C1-C6 described above).

In yet another aspect, some embodiments include a non-transitory computer-readable storage medium storing one or more programs for execution by one or more processors of a storage device, the one or more programs including instructions for performing any of the methods described herein (e.g., C1-C6 described above).

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A method, comprising:
receiving, at computing system, image adjustment information associated with a video stream including images of a first participant;
identifying, for a display layout of a communication application, a location displaying the images of the first participant;
determining, based on the received image adjustment information, a location displaying images of a second participant for the display layout, the received image adjustment information indicating that an eye gaze of the first participant being directed toward the second participant;
computing an eye gaze direction of the first participant based on the location displaying images of the second participant according to the display layout displayed to the first participant;
generating gaze-adjusted images based on the eye gaze direction of the first participant, wherein the gaze-adjusted images include at least one of an adjusted eye gaze direction of the first participant or an adjusted head pose of the first participant according to the received image adjustment information including the eye gaze of the first participant being directed toward the second participant according to the display layout displayed to the first participant; and
replacing the images within the video stream with the gaze-adjusted images.

2. The method of claim 1, further comprising:
capturing, via a camera of the computing system, a second video stream including images of a user of the computing system;
detecting, via a processor of the computing system, a face region of the user within the images;
detecting facial feature regions of the user within the images based on the detected face region;
detecting an eye region of the user within the images based on the detected facial feature regions;
computing an eye gaze direction of the user based on the detected eye region;
identifying a third participant in the display layout based on the eye gaze direction of the user; and
providing gaze information to a gaze coordinator, the gaze information including an identifier associated with the user and an identifier associated with the third participant.

3. The method of claim 2, further comprising:
computing an eye gaze direction of the third participant based on received image adjustment information associated with a second video stream including images of the third participant;
generating second gaze-adjusted images based on the eye gaze direction of the third participant; and
replacing the images within the second video stream with the second gaze-adjusted images.

4. The method of claim 1, further comprising:
generating second gaze-adjusted images based on eye gaze direction of a third participant be directed toward a location other than a display device displaying a graphical user interface of the communication application, the second gaze-adjusted images including a graphic; and
replacing the images within a second video stream including images of the third participant with the second gaze-adjusted images.

5. The method of claim 1, further comprising:
changing an appearance of the eyes of the first participant based on estimates of a head pose; and
changing an appearance of the first participant's head and torso by rotating the first participant's head and torso to generate the gaze-adjusted images.

6. The method of claim 1, wherein the image adjustment information is specific to a participant video stream and the computing system.

7. The method of claim 2, wherein the user has not shared the user's video stream.

8. A system, comprising:
one or more hardware processors configured by machine-readable instructions to:
receive, at computing system, image adjustment information associated with a video stream including images of a first participant;
identify, for a display layout of a communication application, a location displaying the images of the first participant;
determine, based on the received image adjustment information, a location displaying images of a second participant for the display layout, the received image adjustment information indicating that an eye gaze of the first participant be directed toward the second participant;
compute an eye gaze direction of the first participant based on the location displaying images of the second participant according to the display layout displayed to the first participant;
generate gaze-adjusted images based on the eye gaze direction of the first participant, wherein the gaze-adjusted images include at least one of an adjusted eye gaze direction of the first participant or an adjusted head pose of the first participant according to the received image adjustment information including the eye gaze of the first participant being directed toward the second participant according to the display layout displayed to the first participant; and replace the images within the video stream with the gaze-adjusted images.

9. The system of claim 8, wherein the one or more hardware processors are further configured by machine-readable instructions to:

capture, via a camera of the computing system, a second video stream including images of a user of the computing system;

detect, via a processor of the computing system, a face region of the user within the images;

detect facial feature regions of the user within the images based on the detected face region;

detect an eye region of the user within the images based on the detected facial feature regions;

compute an eye gaze direction of the user based on the detected eye region;

identify a third participant in the display layout based on the eye gaze direction of the user; and provide gaze information to a gaze coordinator, the gaze information including an identifier associated with the user and an identifier associated with the third participant.

10. The system of claim 9, wherein the one or more hardware processors are further configured by machine-readable instructions to:

compute an eye gaze direction of the third participant based on received image adjustment information associated with a second video stream including images of the third participant;

generate second gaze-adjusted images based on the eye gaze direction of the third participant; and replace the images within the second video stream with the second gaze-adjusted images.

11. The system of claim 8, wherein the one or more hardware processors are further configured by machine-readable instructions to:

generate second gaze-adjusted images based on eye gaze direction of a third participant be directed toward a location other than a display device displaying a graphical user interface of the communication application, the second gaze-adjusted images including a graphic; and replace the images within a second video stream including images of the third participant with the second gaze-adjusted images.

12. The system of claim 8, wherein the one or more hardware processors are further configured by machine-readable instructions to:

change an appearance of the eyes of the first participant based on estimates of a head pose; and change an appearance of the first participant's head and torso by rotating the first participant's head and torso to generate the gaze-adjusted images.

13. The system of claim 8, wherein the image adjustment information is specific to a participant video stream and the computing system.

14. The system of claim 9, wherein a user of the computing system has not shared the user's video stream.

15. A method for applying gaze adjustment techniques to participants in a video conference, the method comprising:

capturing, via a camera of a computing system, a video stream including images of a user of the computing system;

detecting, via a processor of the computing system, a face region of the user within the images;

detecting facial feature regions of the user within the images based on the detected face region;

detecting an eye region of the user within the images based on the detected facial feature regions;

computing an eye gaze direction of the user based on the detected eye region;

identifying a first participant in a display layout of a video communication application based on the eye gaze direction of the user being directed toward the first participant according to the display layout displayed to the user;

providing gaze information to a gaze coordinator, the gaze information including an identifier associated with the user and an identifier associated with the first participant;

generating gaze-adjusted images based on an eye gaze direction of the user, wherein the gaze-adjusted images include at least one of an adjusted eye gaze direction of the user or an adjusted head pose of the user according to a received image adjustment information including an eye gaze of the user being directed toward the first participant according to the display layout displayed to the user; and replacing the images within the video stream with the gaze-adjusted images.

16. The method of claim 15, further comprising:

receiving, at the computing system, image adjustment information associated with a video stream including images of a second participant;

identifying, based on the display layout of the video communication application, a location displaying the images of the second participant;

determining, based on the received image adjustment information, a location displaying images of a third participant for the display layout, the received image adjustment information indicating that the eye gaze of the second participant is directed toward the third participant;

computing an eye gaze direction of the second participant based on the location displaying images of the third participant according to the display layout displayed to the second participant;

generating gaze-adjusted images based on the eye gaze direction of the second participant, wherein the gaze-adjusted images include at least one of an adjusted eye gaze direction of the second participant or an adjusted head pose of the second participant according to the received image adjustment information including the eye gaze of the second participant being directed toward the third participant according to the display layout displayed to the second participant; and replacing the images within the video stream with the gaze-adjusted images.

17. The method of claim 15, further comprising:

generating gaze-adjusted images based on an eye gaze direction of a second participant being directed toward a location other than a display device displaying a graphical user interface of the video communication application, the gaze-adjusted images including a graphic; and replacing the images within a second video stream including images of the second participant with the gaze-adjusted images.

18. The method of claim 16, further comprising changing an appearance of the user's head and torso by rotating the user's head and torso in an image to generate the gaze-adjusted images.

19. The method of claim 16, wherein the image adjustment information is specific to a participant video stream and the computing system.

20. The method of claim 15, wherein the user has not shared the user's video stream.

* * * * *